United States Patent [19]

Thompson

[11] Patent Number: 4,501,366
[45] Date of Patent: Feb. 26, 1985

[54] PHOTOMULTIPLIER TUBE ASSEMBLY

[75] Inventor: Roger A. Thompson, Littleton, Colo.

[73] Assignee: Adolph Coors Company, Golden, Colo.

[21] Appl. No.: 449,764

[22] Filed: Dec. 14, 1982

[51] Int. Cl.³ .............................................. B07C 5/342
[52] U.S. Cl. .................................. 209/556; 209/588; 250/562
[58] Field of Search ............... 209/555, 556, 558, 576, 209/577, 588; 250/214 B, 214 C, 214 AG, 562, 563; 356/237

[56] References Cited

U.S. PATENT DOCUMENTS

| | | | |
|---|---|---|---|
| 2,798,605 | 7/1957 | Richards | 358/106 X |
| 3,446,972 | 5/1969 | Bentley et al. | 356/229 X |
| 3,514,209 | 5/1970 | McGhee et al. | 356/226 X |
| 4,029,958 | 6/1977 | Wright | 209/555 X |
| 4,036,763 | 7/1977 | Stephenson | 250/214 C |
| 4,061,925 | 12/1977 | van der Gaag et al. | 250/214 B X |
| 4,074,809 | 2/1978 | McMillin et al. | 209/588 |

Primary Examiner—Robert B. Reeves
Assistant Examiner—Edward M. Wacyra
Attorney, Agent, or Firm—Klaas & Law

[57] ABSTRACT

A photomultiplier tube assembly for use in high speed light testing apparatus for making a series of light measurements in rapid succession. Electronic circuitry is described for removing noise from a light measurement signal generated by the photomultiplier tube. Other circuitry is described for sensing the presence or absence of a measured object in a testing apparatus and for switching the photomultiplier tube on and off in response thereto. Circuitry for generating a signal to reject defective articles subsequent to testing is described.

16 Claims, 17 Drawing Figures

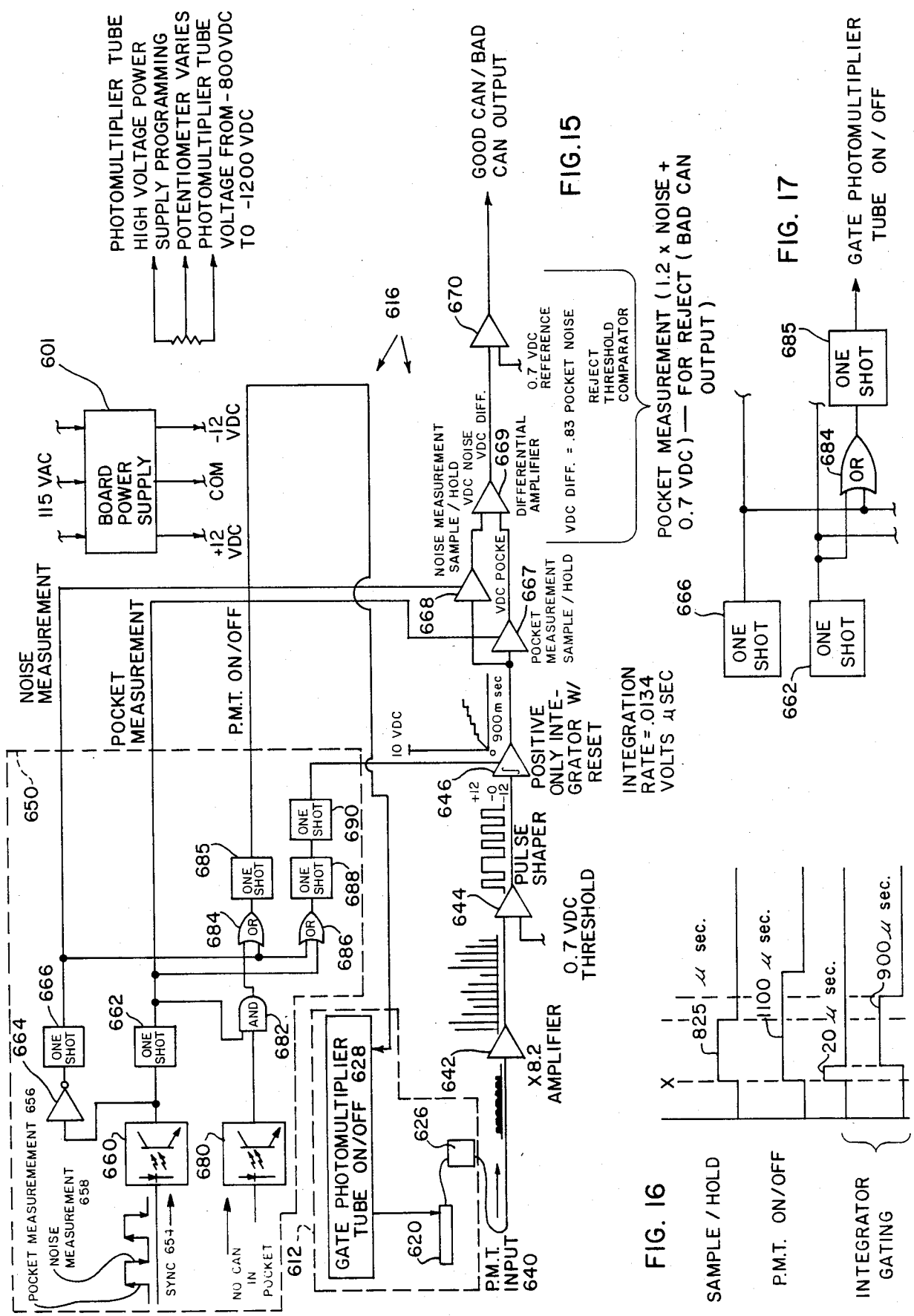

PHOTOMULTIPLIER TUBE ASSEMBLY

BACKGROUND OF THE INVENTION

The present invention relates generally to photomultiplier tube assemblies and more particularly to photomultiplier tube assemblies used in high speed light actuated inspection apparatus.

Photomultiplier tubes of the type conventionally used in industry consist of a photocathode plate positioned at one end of a tubular housing and a chain of dynodes mounted within the housing behind the photocathode. A photon of light striking the forward surface of the photocathode causes it to emit a photo electron from its rear surface which is received by the forward most dynode. Each dynode is connected to an energy source and has the characteristic of emitting a predetermined number of electrons from its surface for each electron received on its surface. Thus each electron striking the surface of the first dynode causes the emission of multiple electrons which strike the surface of the second dynode which in turn emits multiple electrons to the next dynode in the chain. Thus a cascading effect is produced whereby the electron emission from the last dynode is equal to the product of the multiplier effects of each dynode. For example, in a photomultiplier tube having four dynodes each having a multiplier effect of 100 to 1 the total photomultiplier effect of the tube would be $100 \times 100 \times 100 \times 100$ or $10^8$ to 1.

The electron flow is collected by an anode and is thereafter amplified to produce a more easily measureable electrical signal. This electric signal may be further processed to provide an accurate indication of the amount of light entering the photomultiplier tube. Thus a photomultiplier tube may be used to accurately measure an extremely small quanta of light.

Photomultiplier tubes have been used extensively for the purpose of testing products for defects. One such application is described in U.S. Pat. No. 4,074,809 issued to McMillin et al., which is hereby incorporated by reference. In machines of this type can body members held in peripheral pockets of a rotating wheel are inspected at high speed—on the order of 1000 cans per minute. The can bodies have one open end and are inspected by placing the periphery of the open end in a light sealed enclosure with the interior of the can in light transmitting communication with the light receiving end of a photomultiplier tube. The exterior surface of the can is flooded with light and any light passing through a defect in the can body member such as a crack, pinhole, etc., is sensed by the photomultiplier tube. A can reject signal is generated at a predetermined level of light intensity associated with a defect of predetermined size. However, a problem has developed with the use of photomultiplier tubes in applications such as the McMillin et al. invention due to the response characteristics of conventional photomultiplier tubes to an over-lighted condition and also due to other "noise" produced by light leaks in the light sealed enclosure and machine heat, etc.

The dynodes of photomultiplier tubes used in applications such as McMillin et al., are extremely sensitive due to the application of the tube in detecting extremely small amounts of light passing through minute cracks, etc. Thus when a light seal about the can is improperly formed or when a can holding pocket is empty or contains a can having a gross defect, the photocathode is exposed to intense light causing the dynodes to become saturated with electrons. In such a condition, the dynodes continue to emit electrons for several seconds after exposure to the intense light even in the absence of other light, and thus produce a series of erroneous can reject signals. The erroneous reject signals cause subsequently tested cans to be rejected, whether or not defective, until the photomultiplier tube recovers from the intense light exposure. In testing machines such as McMillin et al., which are operating at speeds on the order of 1000 cans per minute, over 100 cans may be tested and improperly rejected during a typical recovery period of approximately ten seconds. Similarly, minute defects in the light sealing apparatus or machine heat transmitted to the photomultiplier tube may generate a low level "noise" signal which is, in effect, added to the amount of signal produced by light from a can defect. The addition of the noise to the signal causes a reject signal at lower light levels than that for which the system was designed, again resulting in unnecessary scrap.

In order to prevent unnecessary scrap in testing apparatus such as McMillin et al., and to improve the performance of photomultiplier tubes in other high speed applications it is desirable to provide a photomultiplier tube assembly which eliminates erroneous signals during the recovery time associated with over exposure to an intense light source and which automatically adjusts itself to account for small light leaks in the system sealing apparatus, machine heat, etc.

SUMMARY OF THE INVENTION

The present invention comprises a photomultiplier tube assembly having a photomultiplier tube subsystem and an interface electronics subsystem. The interface electronics subsystem subtracts out "noise" created by exposure of the photomultiplier tube to an intense light source or other interference such as machine heat, etc., to provide an immediate, accurate, control signal response to subsequent design-condition light exposures. As used herein "design-condition" light exposure will refer to a light level in the range ordinarily present during testing conditions, on the order of $10^{-12}$ watts/cm$^2$. A "bright light event" will refer to the exposure of a photomultiplier tube to an intense light of the type experienced when a can being inspected contains a gross defect and which causes the tube to generate a decaying noise signal thereafter.

In a preferred embodiment of the invention the photomultiplier tube assembly is used in cooperation with a high speed can testing device. In this embodiment a can-testing machine comprising a rotating wheel having circumferentially spaced can pockets therein rotates in a plane perpendicular to a fixed light source on one side of the wheel. A fixed testing assembly containing a photomultiplier tube assembly is mounted on the side of the rotating disk opposite the light source and is constructed and arranged to form a light tight seal with each can body member contained in a can holding pocket of the rotating wheel as an associated can pocket is rotated to a position in alignment with the testing apparatus. During the period of alignment between a can body member and the testing assembly the can body member outer surface is exposed to light by the oppositely positioned fixed light source for the purpose of causing light penetration of any defects in the can body member. The photomultiplier tube is switched on for a short period of time, during the alignment period and thus senses any light penetrating the can body member. The photomultiplier tube is activated a second time during the period between can alignments when the photomultiplier tube is covered by an intermediate portion of the rotating wheel. During this second actuation period, the photomultiplier tube is exposed to maximum darkness. Thus any signal generated by the tube during the second actuation period is representative of system noise.

An alignment sensing device generates a synchronization signal such as a square wave "clock pulse" in response to the rotation of can pockets past the fixed testing assembly with the rising edge of each pulse associated with the period during which the photomultiplier tube is aligned with a can body member and the falling edge of the pulse associated with the period between pockets when the tube is in maximum darkness. The square wave clock pulse is provided to a timing portion of the control electronics which allows the electrical signal generated by the photomultiplier tube to be measured at separate intervals corresponding either to the can alignment period associated with light measurement or the between pocket period associated with noise measurement. A differential amplifier means compares the between pocket signal measurement (i.e. noise) to the next succeeding can alignment signal measurement. A rejection signal is then generated in response to this comparison only if the can alignment measurement exceeds the noise measurement by a predetermined amount.

Thus the photomultiplier tube assembly of the present invention subtracts out noise to provide an accurate light measurement of each can body member being tested.

As presently used in the industry the photomultiplier tube is switched "on" and "off" by means of the energizing current provided to the tube dynodes. Using this technique it has been found that a bright light event, of the type experienced when a can being tested has a large defect, will cause the tube to generate a constant, maximum level signal for several seconds after the bright light event before the signal level starts to decay. Using prior art switching techniques the above described noise subtraction technique would not provide reliable results following a bright light event due to the fact that there would be no difference between the noise measurement and the alignment measurement for the several seconds following the bright light event because both measurements would indicate the maximum signal level.

In order to overcome this problem novel switching electronics are provided to reduce the recovery time of the photomultiplier tube and to eliminate certain conditions that produce such bright light events. Specifically, the polarity between the photocathode and first dynode is reversed after each measurement to reduce the time required for the tube to recover. This feature ensures that the tube will recover quickly enough from most bright light events to provide a measurement signal at a level below the maximum signal levels. Thus a meaningful comparison can be made between a noise signal and the next can alignment signal because the presence of any light passing through the can will be reflected in the alignment signal as an increase over the noise signal strength. Electronic circuitry is also provided for sensing the absence of a can in a pocket and for leaving the photomultiplier tube switched "off" when the empty pocket comes into alignment position. Thus, a significant number of bright light events are avoided.

BRIEF DESCRIPTION OF THE DRAWINGS

The inventive concepts are illustrated in apparatus comprising a presently preferred embodiment thereof on the accompanying drawings in which:

FIG. 15 is a schematic circuit diagram showing the operation of a photomultiplier tube electronics interface subsystem.

FIG. 16 is a diagram showing the operational timing sequence of various components of a photomultiplier tube electronics interface subsystem of the type illustrated in FIG. 15.

FIG. 17 is a fragment of a schematic circuit diagram showing an alternate embodiment of the electronic interface subsystem of FIG. 15.

DETAILED DESCRIPTION IN GENERAL

Figure 8:
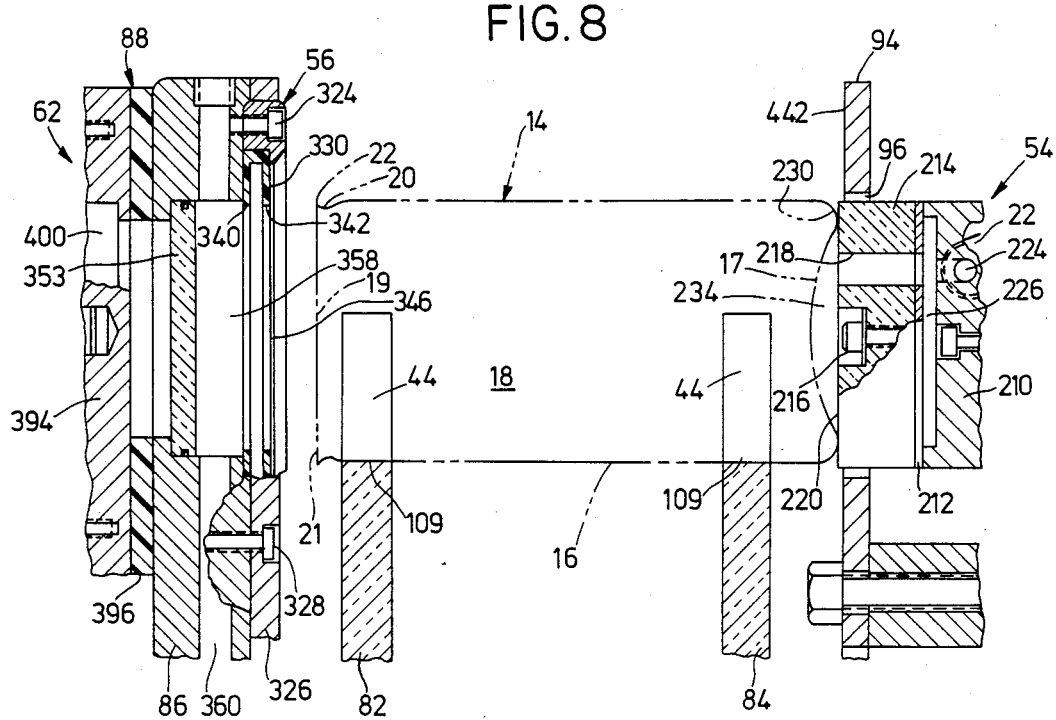
FIG. 8 is an enlarged cross-sectional view of a portion of the apparatus of FIG. 4 enclosed by the dashed line 8—8 prior to sealing association of the can body member with a sealing means.
Figure 10:
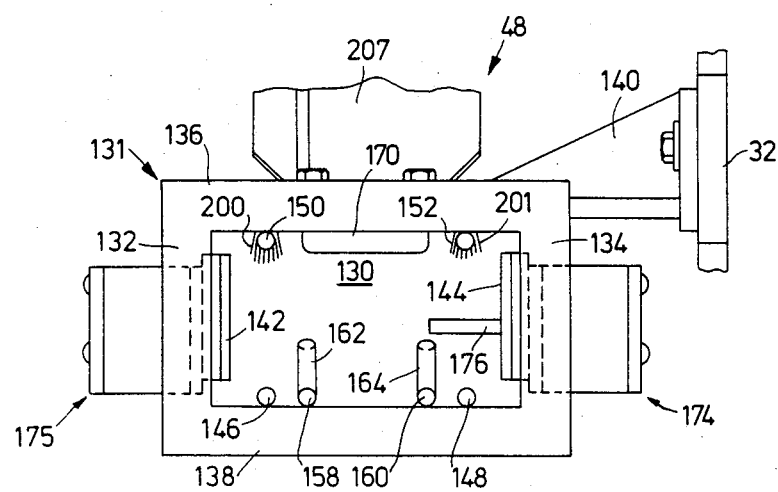
FIG. 10 is an enlarged end view of a portion of the apparatus taken along the line 10—10 in FIG. 6.
Figure 9:
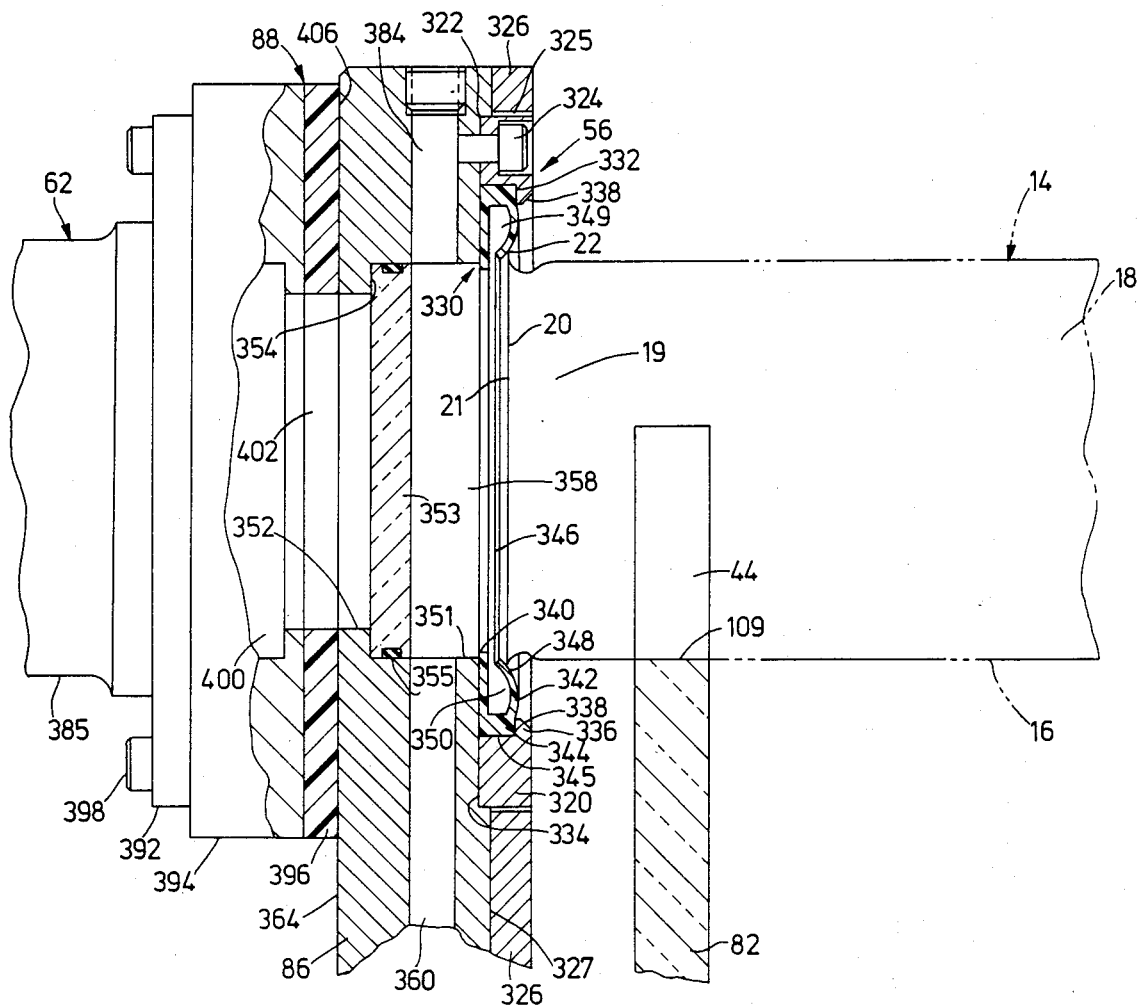
FIG. 9 is an enlarged cross-sectional view of the portion of the apparatus of FIG. 4 enclosed by the dashed line 8—8 after sealing association of the can body member with the sealing means.

While certain of the inventive concepts are applicable to the use of photomultiplier tube generally, the embodiment of the present invention illustrated in the drawing is particularly adapted for variable speed testing of one piece aluminum can body members 14 utilized for manufacture of two piece metal cans. As shown in FIGS. 8 and 9, such one piece metal can body members comprise an annular sidewall portion 16, closed at one end by an inwardly domed concave bottom wall portion 17, to define a container cavity 18, while having an annular opening 19 at the opposite end surrounded and defined by a formed generally radially outwardly extending annular flange portion 20, having a generally radially extending outer side surface 21 terminating in an annular edge portion 22. Such can body members are conventionally utilized to package beer, soft drinks, and other products by filling the container cavity 18 with the product and then sealingly attaching an end closure member over the opening 19 in sealed association with the flange portion 20 which is further deformed during the attachment process to effect a sealed relationship with the end member. In addition, the outer peripheral surface of sidewall portion 16 conventionally has a label of printed ink applied thereto.

It is desirable to inspect such can body members for "defects" prior to filling the can body member with the product to be packaged therein and prior to associating the end closure member therewith. Among the various "defects" in the can body member which should be preferably detected before filling and closing are: (1) any pin holes which will prevent complete sealing of the contents; (2) any cracks or deformation in the flange portion 20 which will prevent proper sealed association with the end closure member; (3) any dents or deformation in the sidewall portion 16 which may affect the round annular conditions of the flange portion 20 and, hence, prevent proper sealed association with the end closure member or the appearance of the finished filler container; and (4) the absence of a printed ink label on the outer peripheral surface of the sidewall portion 16.

Figure 1:
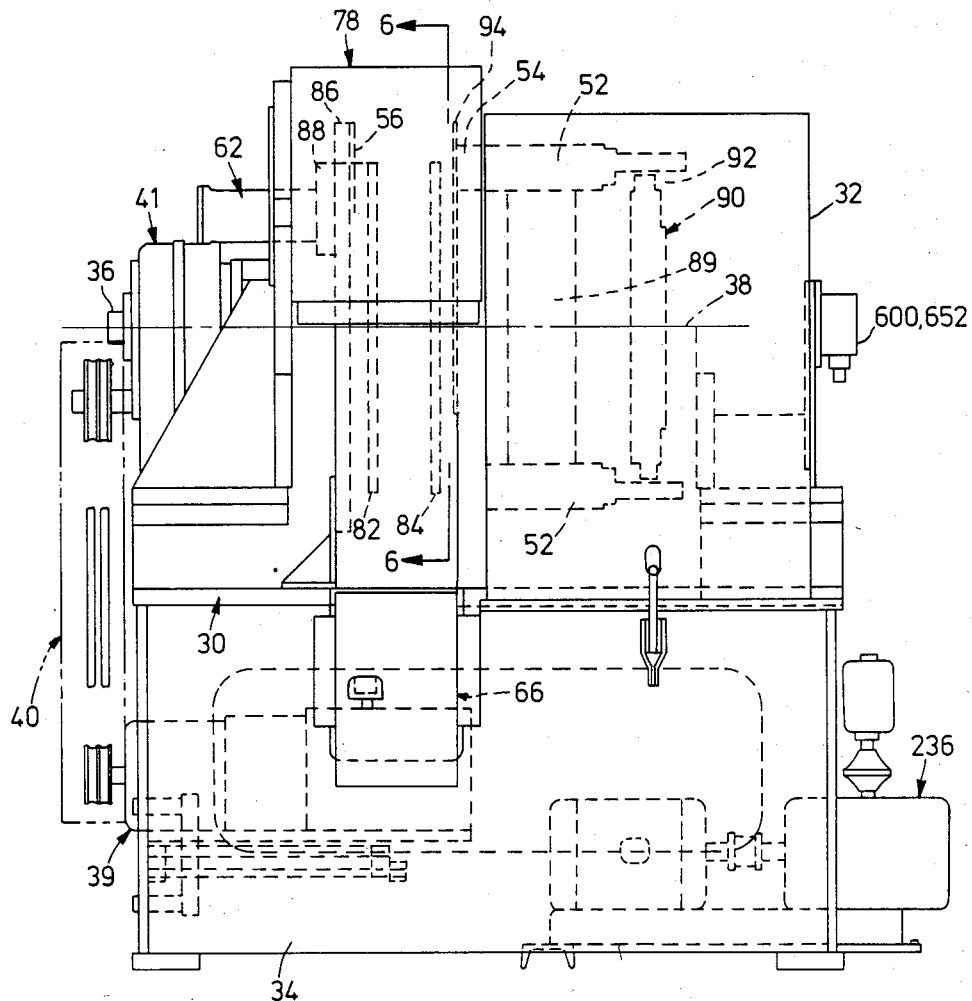
FIG. 1 is a side elevation view of the apparatus.
Figure 3:
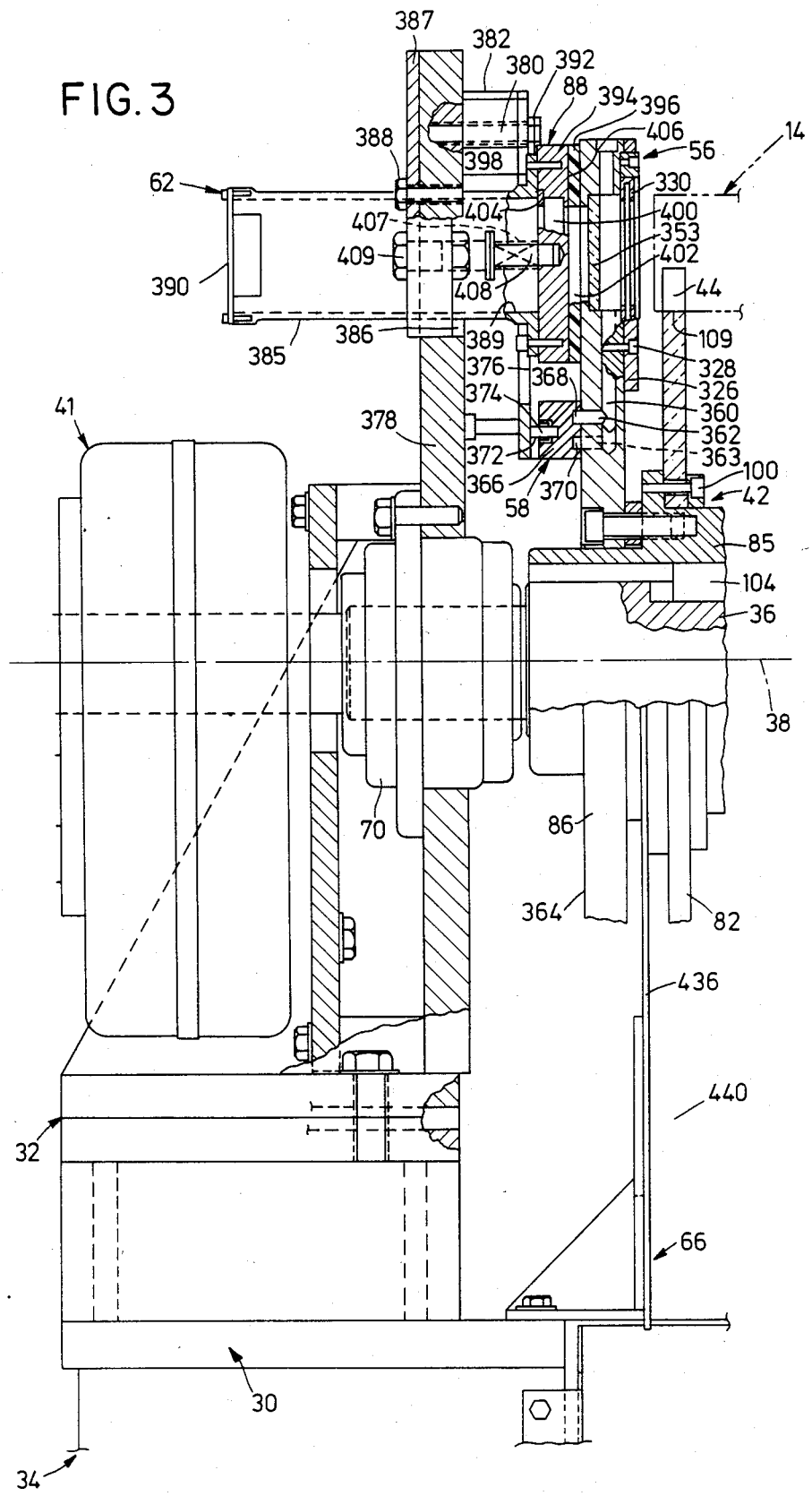
FIG. 3 is an enlarged partial cross-sectional side elevational view of the lefthand portion of the apparatus of FIG. 1 taken along line 3—3 in FIG. 2.
Figure 7:
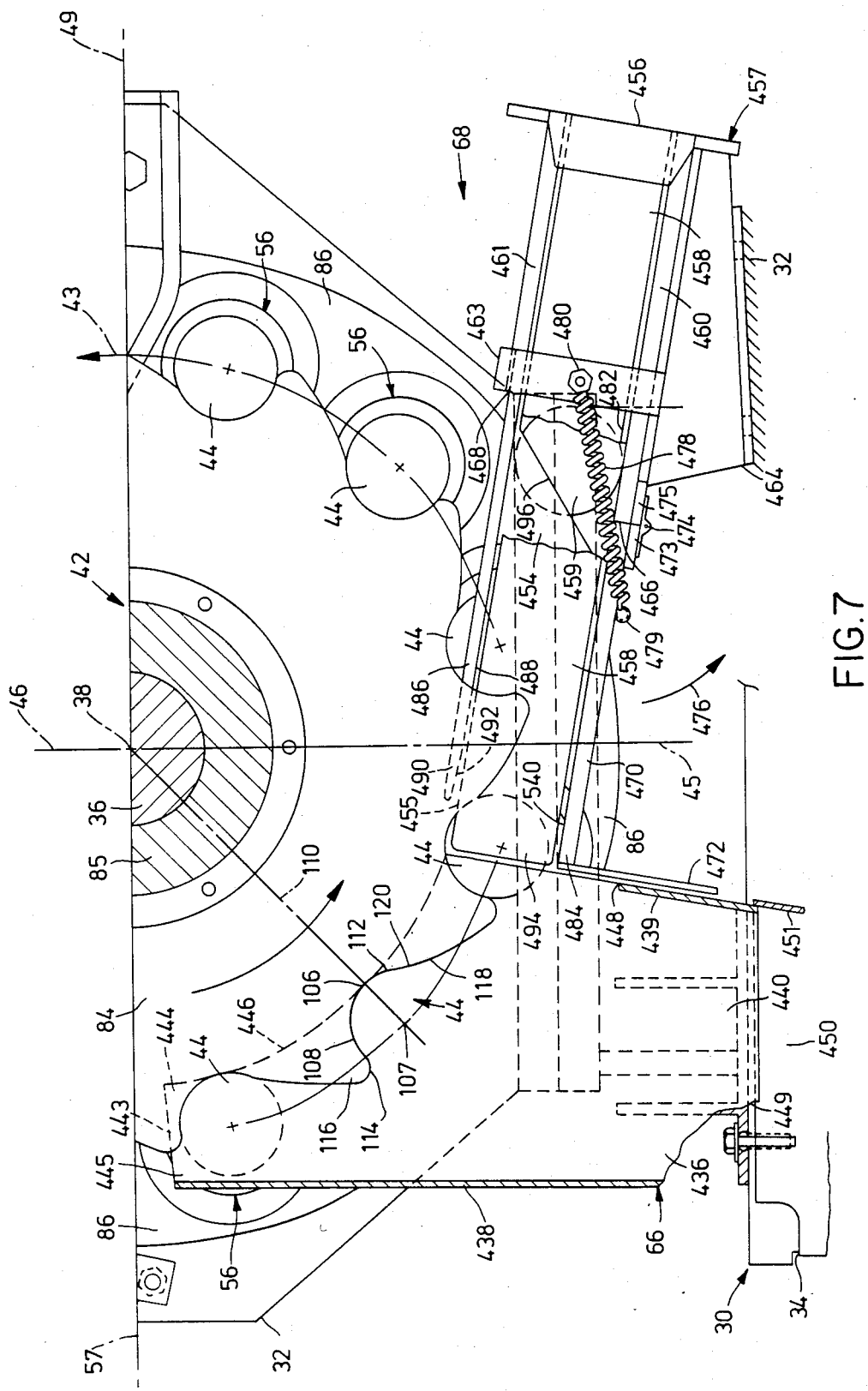
FIGS. 6 and 7 are enlarged partial cross-sectional views, with parts removed, taken along the line 6—6 in FIG. 1.
Figure 6:
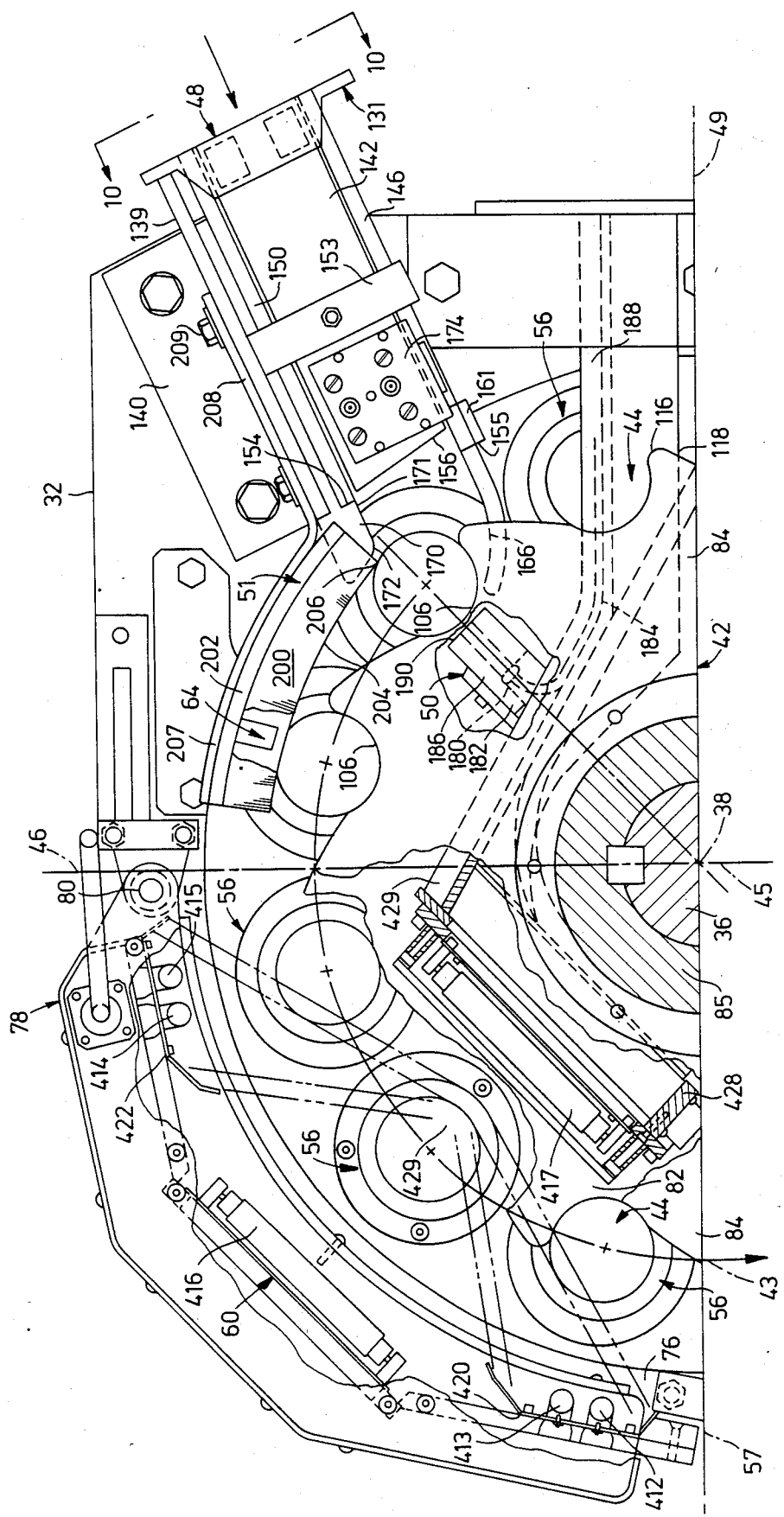
Figure 14:
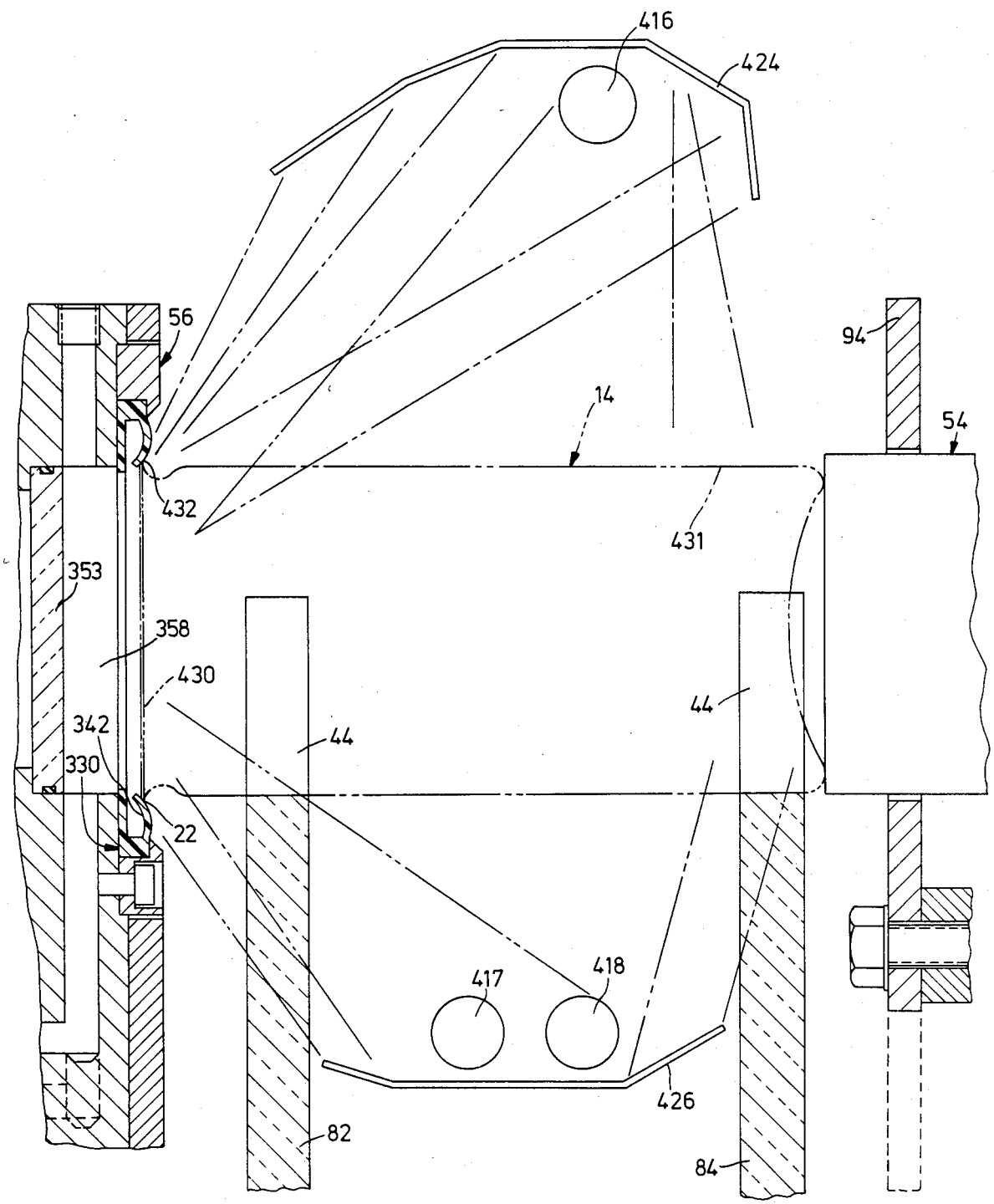
FIG. 14 is an enlarged cross-sectional view of a portion of the apparatus of FIG. 6.

In general, the presently preferred embodiment of the invention shown in the accompanying drawing comprises: frame and housing means 30 having upper and lower portions 32, 34 for the machine components; horizontally extending rotatable drive shaft means 36 for continuous rotation of various machine components about a central axis of rotation 38; electric motor means 39, belt-pulley drive means 40, and speed reducer means 41 for causing continuous rotation of the rotatable shaft means; can body member transfer wheel means 42 mounted on the rotatable shaft means for continuous rotation therewith and for carrying can body members in a circular path 43, FIGS. 6 and 7, in the direction of the arrows thereabout; a plurality of pocket means 44 circumferentially spaced about the outer periphery of said transfer wheel means for receiving a can body member 14 and supporting the can body member sidewall portion 16 in each pocket means, there being twelve axially spaced pairs of such pocket means in the illustrative embodiment, and for transferring each can body member along the circular path of movement only during a portion of each revolution of the transfer wheel means with each pocket means being carried generally upwardly between lower vertical centerline 45 and upper vertical centerline 46 during 180° of each revolution and generally downwardly during the other 180° of each revolution of the transfer wheel means; infeed means 48 non-rotatably mounted on the frame and housing means for loading one can body member in each of the pocket means during the last 90° of the generally upward movement of the pocket means between horizontal centerline 49 and upper vertical centerline 46 during each revolution; empty pocket detection means 50, FIG. 6, for providing a control signal whenever no can is placed in the pocket means 44 at the infeed means 48; non-rotatable seating means 51, mounted in juxtaposition to the infeed means for seating each can body member on a surface of each of the pocket means during the last 90° of the generally upward movement of the pocket means between centerlines 49, 46 during each revolution; extendable and retractable means 52, FIG. 1, mounted on the drive shaft means for rotation therewith, there being one such means for each of the pocket means, and for axially moving each can body member in each of the pocket means between a first axially retracted position and a second axially extended position during each revolution; releasable holding means 54 associated with each of the axially extendable and retractable means for abutting and releasable holding engagement with the bottom wall portion of each can body member in each of the pocket means during predetermined portions of each revolution; flange portion sealing means 56 associated with each of the axially extendable and retractable means and each of the pocket means and being mounted on the drive shaft means for rotation therewith and for sealable engagement with the flange portion 20 of each can body member carried in each of the pocket means during the first 90° of the generally downward movement of the pocket means between upper vertical centerline 46 and horizontal centerline 57, FIG. 6, during each revolution; pressurization means 58, FIG. 3, associated with each of the sealing means for applying pressurized air to the sealing means for obtaining a minimum area of sealable engagement between the sealing means and the flange portion 20 of each can body member and for applying pressurized air through the can body member opening 19 to the container cavity 18 to apply outwardly directed force on the interior surfaces of the can body member to outwardly flex the sidewall portion 16 and the bottom wall portion 17 to enhance the detection of pin holes by passage of light therethrough; non-rotatable light applying means 60, FIGS. 6, 14 for applying light to the exterior surfaces of each pressurized can body member in each of the pocket means in sealable association with the sealing means and being located to provide a continuous light zone during the first 90° of the generally downward movement of the pocket means during each revolution; light detection means 62, FIG. 1, non-rotatably mounted relative to the transfer wheel means and the sealing means and being located for successive axial alignment with each of the pocket means, after sealable association of the flange portion with the sealing means and pressurization of the sealing means and the can body member carried in the pocket means, in the light zone for receiving light only from the light applying means through the can body member and/or between the flange portion and the sealing means, and for generating a first defective can control signal upon receipt of light to provide an indication of a defective can body member; non-printed can body member detection means 64, FIG. 6, non-rotatably mounted relative to the transfer wheel means and located in juxtaposition to the seating means and adjacent the outer peripheral surface of the sidewall portion 16 of each can body member while being carried by the pocket means along the circular path for providing a second defective can control signal in response to light reflected from the outer peripheral surface of non-printed can body members; defective can body member discharge chute means 66, FIG. 7, for receiving defective can body members from the pocket means on the transfer wheel means during only the last 90° of the generally downward movement of the pocket means between horizontal centerline 57 and lower vertical centerline 45 during each revolution; and non-defective can body member unloading chute means 68, FIG. 7, for receiving non-defective can body members from the pocket means on the transfer wheel means during only the last part of the last 90° of the generally downward movement of the pocket means during each revolution.

Figure 2:
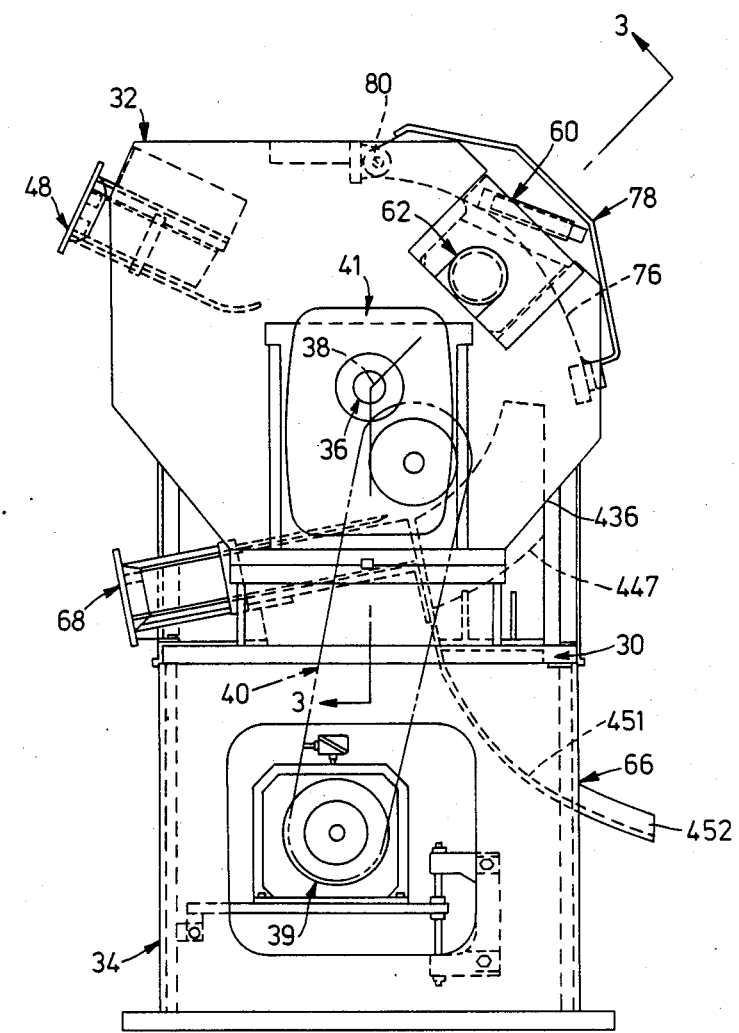
FIG. 2 is an end view of the apparatus of FIG. 1.

Referring now to FIGS. 1 and 2, in general, the test apparatus is mounted in relatively compact frame and housing means 30 comprising a lower motor and control housing portion 34 and an upper test apparatus portion 32. In the illustrative embodiment the housing means has a height of 51 inches, a length of 46 inches, and a width of 29 inches. The conventional electric motor-transmission means 39 is drivably connected by the conventional belt-pulley means 40, and the conventional speed reducer box 41 to the central axially extending shaft means 36 rotatably supported by suitable bearing means 70, 72, FIGS. 3–5.

The rotatable can body member transfer wheel means 42 is fixedly mounted on a central portion of shaft means 36 for continuous rotation therewith in a closed or partially closed generally annular test chamber 74 having an access opening 76, FIG. 2, closable by a light sealing door means 78 pivotally mounted at 80, FIG. 2.

The transfer wheel means 42 comprises a pair of axially spaced annular transparent plate members 82, 84 on which the plurality of peripheral circumferentially spaced and coaxially aligned can body receiving pocket means 44, FIGS. 6 and 7, are provided. A hub member 85 fixedly mounts the plate members 82, 84 on shaft means 36 for continuous rotation therewith.

The sealing means 56 are rotatably carried by an annular sealing wheel means 86, and peripherally mounted thereon in circumferentially spaced coaxially aligned relationship with pockets 44. Wheel means 86 is fixedly mounted on shaft means 36 by hub member 85 for continuous rotation therewith and located in axially spaced relationship to transfer wheel member 82.

The light detector means 62 is fixedly mounted on the side wall of chamber 74 and extends axially into chamber 74 with a sealing head means portion 88 coaxially alignable with sealing means 56 and mounted in sealed engagement with the adjacent side surface of sealing wheel means 86.

Figure 5:
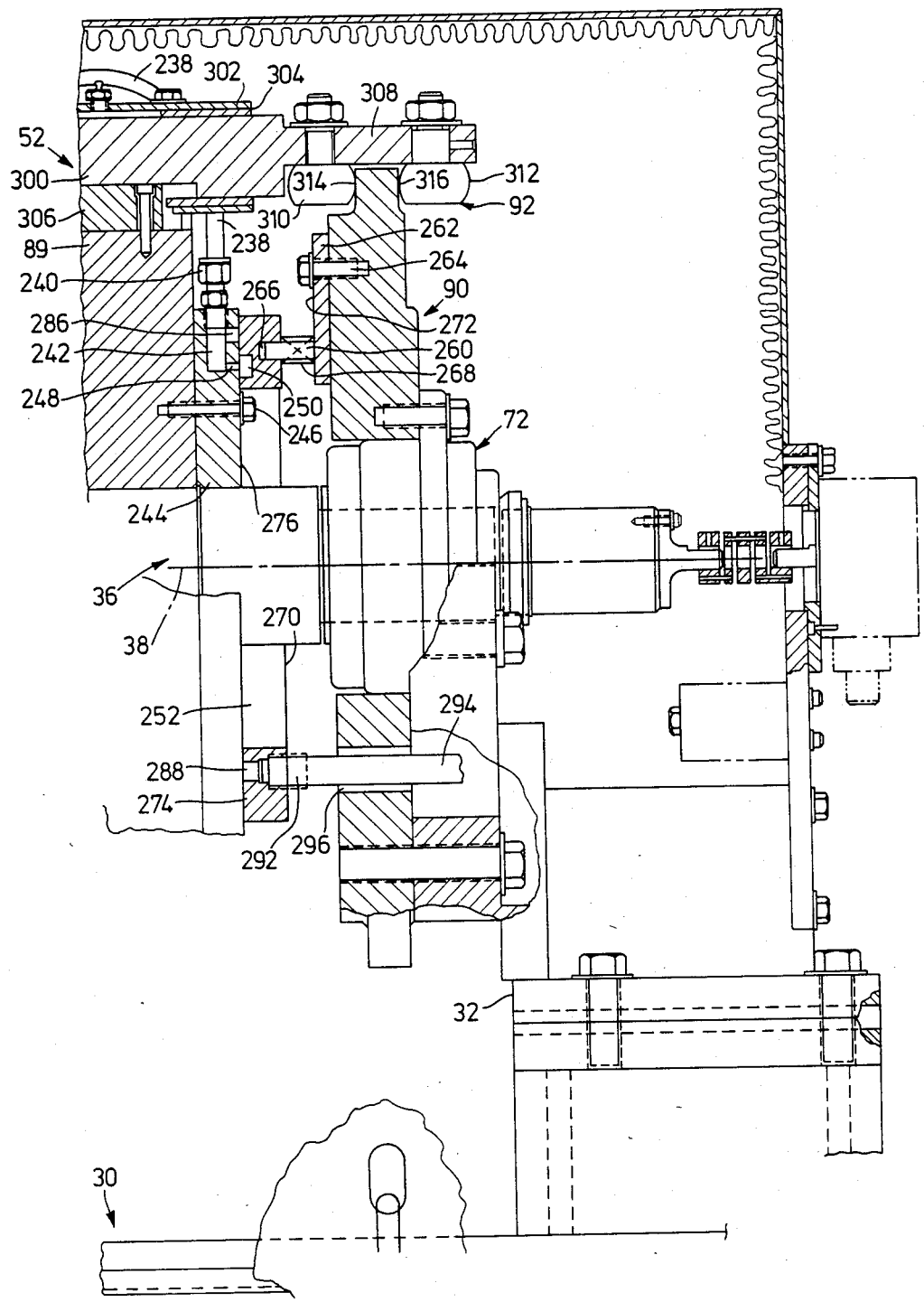
FIG. 5 is an enlarged partial cross-sectional view of the right hand portion of the apparatus of FIG. 1 axially next adjacent the apparatus shown in FIG. 4.

The releasable holding means 54 are coaxially mounted on the ends of the extendable and retractable means 52 in circumferentially spaced and coaxial alignment with pockets 44. The releasable holding means 54 and extendable and retractable means 52 are fixedly mounted on shaft means 36 by a hub member 89 for continuous rotation therewith in axially spaced relationship to transfer wheel member 84. A cam plate means 90, FIG. 5, is fixedly mounted relative to shaft means 36 for caming engagement with cam follower means 92 to extend and retract means 52. A can body member guide plate means 94 is fixedly mounted on hub member 89 for continuous rotation with shaft means 36 and has a plurality of circumferentially spaced openings 96, FIG. 8, coaxially aligned with holding means 54 to enable axial movement of the holding means therethrough.

RELEASABLE HOLDING MEANS

Figure 4:
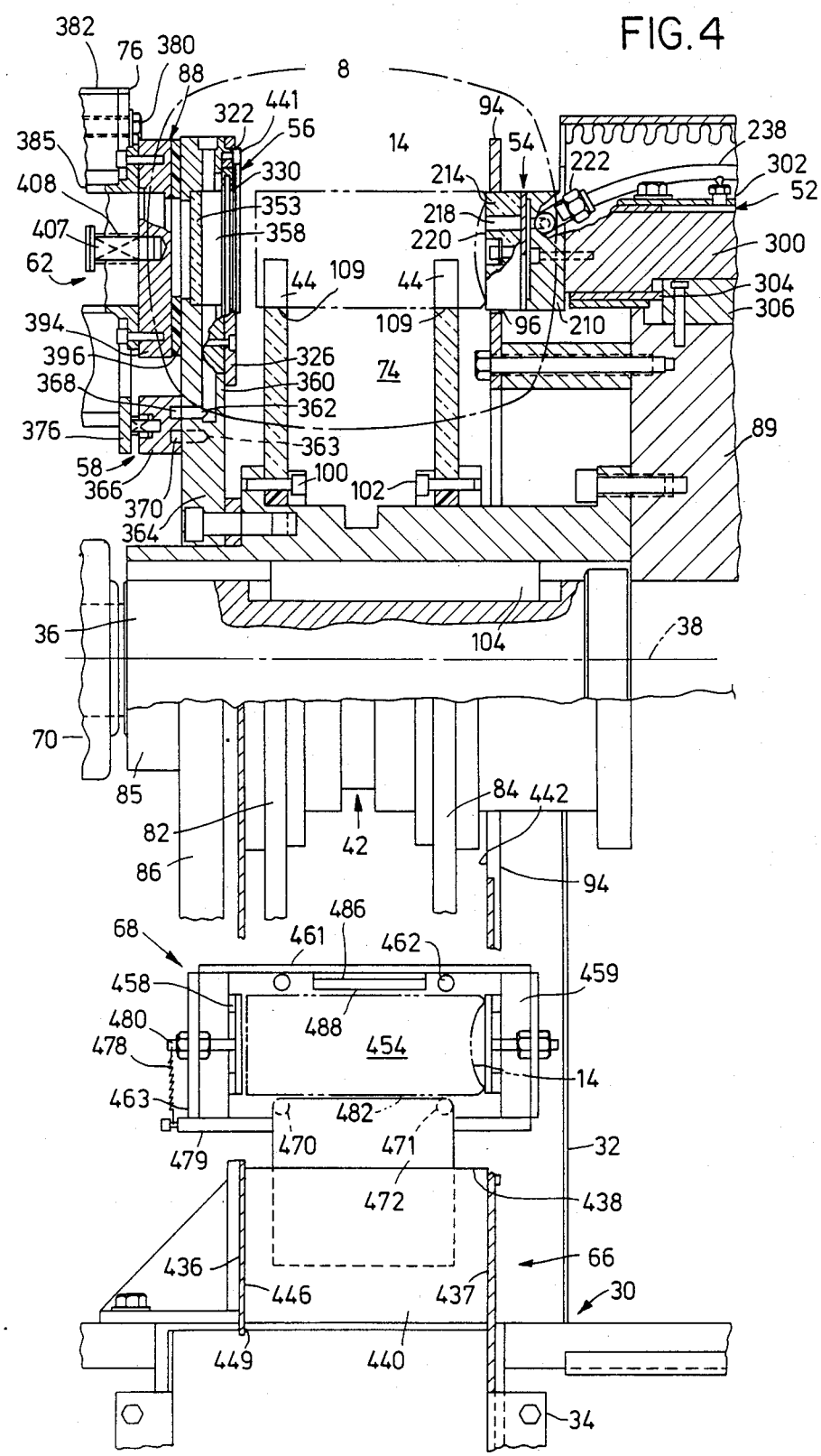
FIG. 4 is an enlarged partial cross-sectional side elevational view of an intermediate portion of the apparatus of FIG. 1 axially next adjacent the apparatus shown in FIG. 3.

Referring now to FIGS. 4 and 8, the releasable holding means 54 comprise twelve separate equally circumferentially spaced axially extendable and retractable units which are rotatable with wheel members 82, 84 in general axial alignment with pockets 44. Each unit comprises an annular mounting block member 210, a spacer member 212, and an annular transparent support plate member 214 attached to member 210 by suitable recessed fastening means 216. A vacuum and air passage 218 extends axially through flat front end surface 220 and is connected to vacuum supply coupling 222 through a passage 224 and a chamber 226 without use of a flap valve to control vacuum conditions as described in U.S. Pat. No. 3,370,877. The arrangement, as hereinafter described in further detail, being such that, as shown in FIG. 8, the bottom end wall portion 17 of a can body member 14 is held against the surface 220 of plate member 214 with abutting substantially sealing engagement established along the annular rim portion 230 of the can body member to provide a vacuum chamber 234, between surface 220 and the inwardly domed bottom end wall portion 17 connectable to a vacuum source through passage 218.

The passages 218, 224, and chamber 226 are connectable to a conventional vacuum source, such as a vacuum pump and control assembly 236, FIG. 1, at predetermined times during each revolution, through coupling 222, a flexible hose 238, a coupling 240, FIG. 5, a radially extending passage 242 in an annular connecting plate 244 fixed to hub member 89 by suitable fastening members 246 for rotation therewith, an axially extending passage 248, and an arcuate vacuum supply chamber 250 in a non-rotating manifold ring member 252 which is connected to the vacuum source in a manner to be hereinafter described. Pin members 260 are fixedly mounted on an annular ring plate member 262, fixedly non-rotatably mounted on plate member 90 by suitable fastening elements 264, and are loosely received in axially aligned bores 266 in manifold ring member 252 to retain the ring member 252 in non-rotational relationship relative to rotating connecting plate member 244. The bores 266 are larger than the pin members 260 to enable relative axial sliding movement therebetween so that compression spring members 268, mounted circumjacent pin members 260 between axially spaced side surfaces 270, 272, are effective to axially bias the smooth polished side surface 274 of manifold ring member 252 into abutting sealing engagement with the smooth polished side surface 276 of connecting plate member 244.

Figure 11:
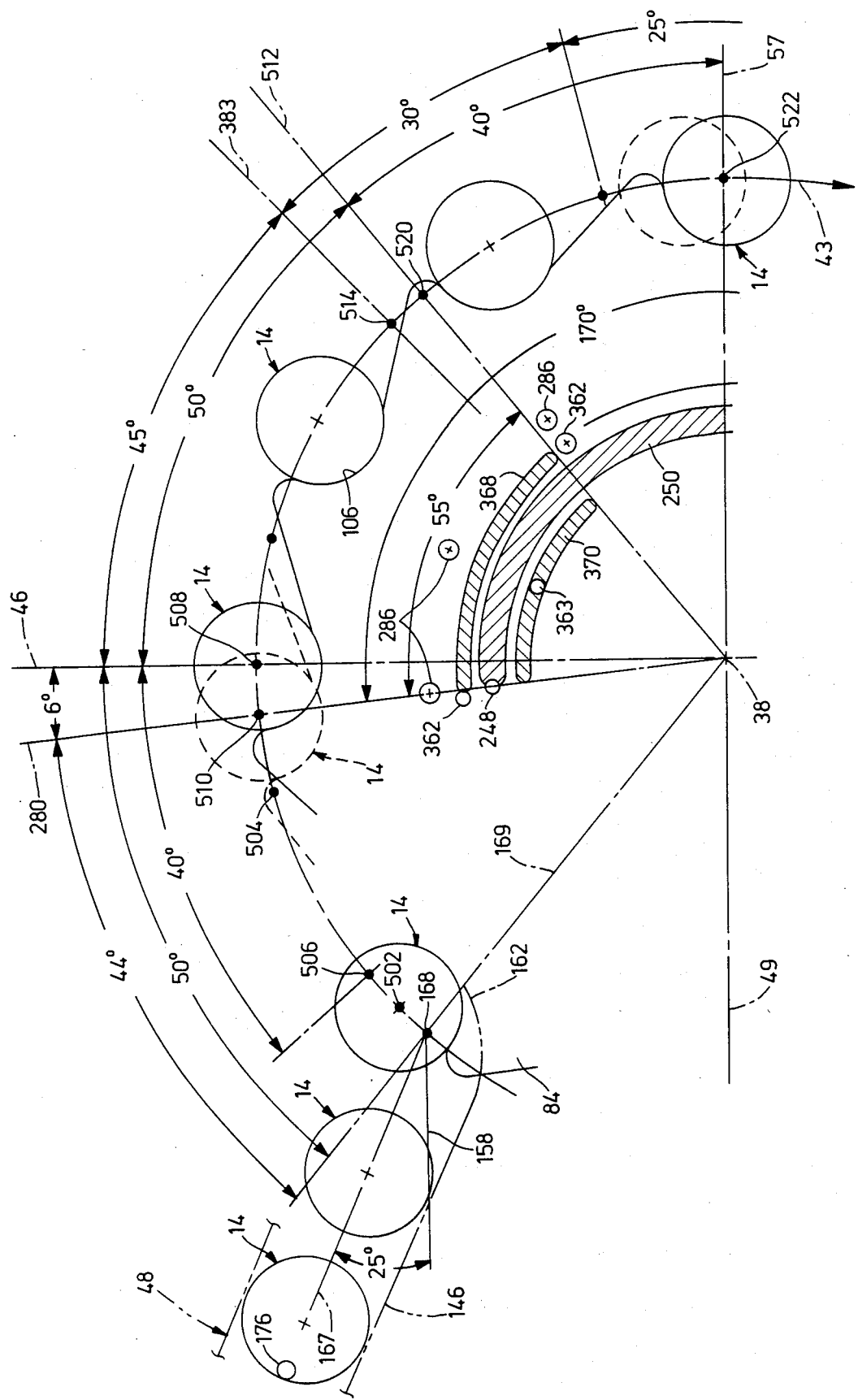
FIGS. 11 and 12 are enlarged schematic representations of portions of the apparatus illustrating the sequence of operation thereof.
Figure 12:
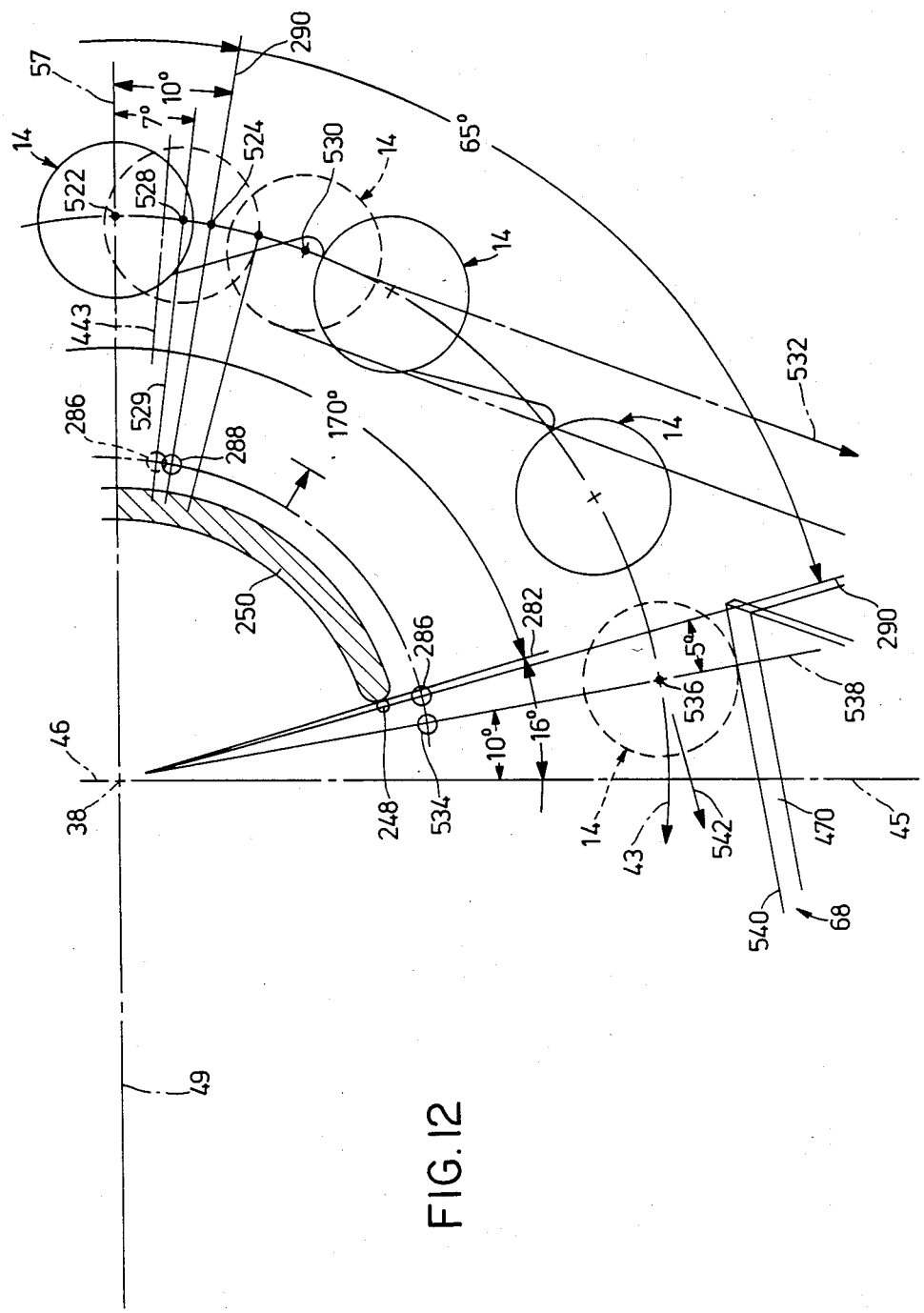

Referring now to FIGS. 11 and 12, each of the passages 218 of FIG. 4 in each of the support head plates 214 is abutting substantially sealing engagement established along connectable, at predetermined locations during each revolution, when the associated passage 248 in connecting ring member 244 becomes aligned with the arcuate vacuum chamber 250 which extends arcuately circumferentially approximately 170° in manifold plate member 252 from approximately 6° (at radial line 280) before upper vertical centerline 46 to approximately 16° (at radial line 282) before lower vertical centerline 45. The vacuum chamber 250 is continuously connected to the vacuum source 236 by a fixedly mounted coupling and a flexible conduit (not shown) extending axially through an axially extending bore in plate member 90 in a manner to be hereinafter described in reference to pressurized air supply means.

The passages 218, 224, 228 are also connectable to a conventional source of pressurized air (not shown) through coupling 222, flexible hose 238, coupling 240, radially extending passage 242, and an axially extending passage 286 which is connectable, at predetermined times during each revolution, to a second axially extending air passage 288 located in non-rotating manifold ring 252 approximately 75° (at radial line 290) below horizontal centerline 57. Air passage 288 is controllably connected to a conventional source of pressurized air (not shown) through conventional control valve apparatus (not shown) by a separate coupling member 292, FIG. 5, and flexible conduit 294 extending through a bore 296 in non-rotating plate member 90, the vacuum chamber 250 being connected to the vacuum source by a similar arrangement.

SEALING MEANS

Referring now to FIGS. 8 and 9, sealing means 56 comprises twelve circumferentially spaced units mounted on rotatable plate member 86 in coaxial alignment with the pocket means 44 and the holding means 54. As shown in FIG. 9, each sealing head means 56 comprises can body member flange sealing means in the form of an annular mounting ring member 320 suitably fixedly connected to the rotatable plate 86 within an annular counterbore 322 by suitable fastening elements 324 and within an annular opening 325 in a ring member 326 mounted on the side surface 327 of member 86 circumjacent mounting ring members 320 by suitable fastening elements 328.

Figure 13:
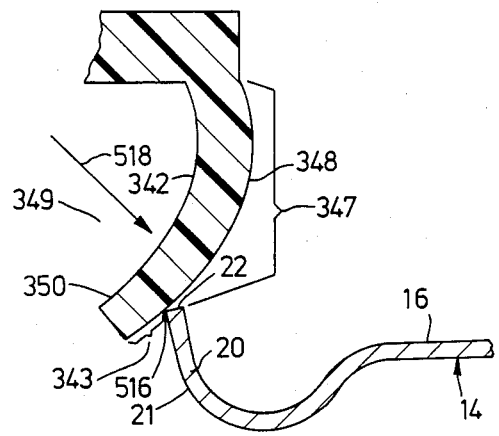
FIG. 13 is an enlarged cross-sectional view of a portion of the sealing means and a portion of the can body member of FIG. 9.

An annular resilient flexible sealing ring member 330 of the general type disclosed in U.S. Pat. No. 3,672,208 is fixedly mounted between surface 332 of ring member 320 and surface 334 of plate member 86. Ring member 320 has a radially inwardly extending flange portion 336 with an inwardly tapered front surface 338. Ring member 330, which is made of suitable resilient molded plastic material, such as Neoprene or Urethane or the like, has a U-shaped cross-sectional configuration including first and second identical radially inwardly extending axially spaced annular flange portions 340, 342 connected by axially extending rim portion 344 so as to be reversible. The rim portion 344 is abuttingly sealingly received on annular surface 345 of member 320. The side surface of the inner flange portion is abuttingly received on surface 334 of member 86. The outer flange portion 342 freely extends generally radially inwardly from rim portion 344 for resilient flexible displacement relative thereto. Flange portions 340, 342 extend radially inwardly substantially beyond the annular outer edge portion 22 of the can body members supported in pockets 22 and terminate in an annular lip portion 346 having a diameter less than the outside diameter of the can body member rim portion 22. Thus, the outer side surface 348 of the outer flange portion 342 is engageable with the outer edge 22 of the flange portion along a relatively small width annular overlapping portion 343 of the outer surface 348 of portion 342, FIG. 13. The arrangement is such as to effect sealing engagement therebetween by substantially line contact when the flange portion of the can body member is in engagement therewith. As shown in FIGS. 9 and 13 during sealing engagement with the rim portion 22, the flange portion 342 is resiliently flexible outwardly bowed so that a balloon portion 347 of the outer side surface 348 has a curvature to further assure the desired sealing engagement by substantially line contact. A pressurization chamber 349 is defined by flange portions 340, 342 and rim portion 344 whereby pressurized air in chamber 349 may be applied to the inner surface 350 of the outer flange portion 342 to further control and obtain the desired sealing engagement with the can body rim portion 22.

PRESSURIZATION MEANS

In order to supply pressurized air to the inside 18 of the can body member and to the chamber 349 of the sealing ring member 330 as well as permit passage of light to the light detection means 62, counterbores 351, 352 extend through plate member 86 in coaxial alignment with pockets 44 and sealing means 56. An annular plate 353 of transparent material, such as Plexiglas or the like, is fixed in bore 351 against a shoulder 354 and sealably mounted therein by an 0-ring peripheral sealing member 355 to define a chamber 358 to receive pressurized air from a radially extending passage 360 and to enable the passage of light therethrough from chamber 358 to bore 352. With a can body member mounted on the releasable holding means 54 and with shaft member 300 extended to engage the rim portion 22 of the can body member with the sealing lip portion 342, a closed pressure chamber means is defined by the transparent annular plate 353, bore portion 351, the sealing ring means 330, and the can body member 14.

In order to pressurize the pressure chamber means at predetermined times, each bore portion 351 is connectable by a radially inwardly extending passage 360 in member 86 to an axially extending passage 362 or 363, FIGS. 3 and 11, in member 86, which open through side surface 364. A manifold arcuate segment member 366, FIG. 3, having two radially offset circumferentially extending arcuate pressure chambers 368, 370, is held in sealing abutting engagement on surface 364 by spring means 372 mounted circumjacent retaining pin members 374 carried by a non-rotatable support plate 376 fixed to another non-rotatable support plate member 378 by suitable fastening elements 380 and spacer elements 382. The arrangement is such that alternate ones of the pressure chamber means 358 are connected to pressure chambers 368, 370 by varying the length of alternate passages 360 and the radial location of alternate passages 362 and 363 as illustrated in FIG. 11. In this manner, a source of air pressure (not shown) is connected by suitable passage means (not shown) to manifold chambers 368, 370 and at predetermined times passages 362, 363 are aligned with chambers 368, 370 to deliver air pressure to the pressure chamber means for purposes to be hereinafter described. In addition, at predetermined times, the passages 362, 363 are located in circumferentially spaced relationship to the manifold member 366, which is in the form of an arcuate segment, whereat the pressure chamber means is vented to the atmosphere. As shown in FIG. 11, chambers 368, 370 extend circumferentially approximately 55° from a position, represented by radial line 280 prior to the upper vertical centerline 46 to a position slightly beyond the test station represented by radial line 383. It is noted that a portion 384 of axial passage 360 is extended radially outwardly beyond chamber 358 for manufacturing purposes and is suitably sealed as by a threaded closure.

TRANSFER WHEEL MEANS AND POCKET MEANS

Referring now to FIGS. 3 and 4, the plate members 82, 84 of the transfer wheel means 42 are of identical construction and each may be made of one piece or mating semi-cylindrical segments, of suitable transparent material, such as Plexiglas or Lucite, to enable uniform transmission of light to the entire outer surface of the can body members during testing. The plate members 82, 84 are fixedly attached to hub member 85 by a plurality of suitable fastening members 100, 102 and hub member 85 is fixedly attached to shaft means 36 by a key member 104.

In the presently preferred and illustrative embodiment, each of the plate members 82, 84 has twelve pockets 44 which are equally circumferentially spaced and coaxial with the pockets of the other plate member. As shown in FIG. 7, each pocket comprises a radially formed arcuate segment surface 106 having a center of curvature located at 107 in general coaxial alignment with the holding means 54 and the sealing means 56 so that can body members supported on surface 106 will also be located in general coaxial alignment with the holding means 54 and the sealing means 56. Surfaces 106 extend circumferentially approximately 140° with a trailing surface portion 108 of approximately 95° on the trailing side of a radial line 110, extending from the central axis of shaft 36, and a leading portion 112 of approximately 45° on the leading side of radial line 110. The trailing surface portion 108 merges tangentially with a radial surface 114 of a radially outermost cam lobe portion 116 of the plate members. The leading surface portion 112 intersects an elongated curved surface portion 118 to provide a slight transition shoulder at 120. The cam lobe portion 116 extends radially outwardly beyond center 107 so that surface 114 is effective at the can body member loading position adjacent the infeed means 48, FIG. 6, to remove the can body member being loaded into the pocket 44 while also providing a cam surface means effective to hold the next can body member in the infeed means 48 clear until the following ramp surface 118 of the following pocket begins to engage the next can body member. Ramp surface 118 provides a cam surface means effective to gradually advance the next can body member to the following pocket. Shoulder 120 is effective as the can body member leaves the loading position and approaches the seating means 51 to properly seat the can body member on surface 106 between surfaces 114 and 118.

EMPTY POCKET DETECTION MEANS

In order to provide a control signal indicating the absence of a can body member in pockets 44 after passing the infeed means, an empty pocket detection means 50, FIG. 6, in the form of a conventional magnetic field type sensor device 180 mounted in a support member 182 is connected to control means (as described in further detail hereinafter) by an electrical line 184. Member 182 is adjustably fixedly mounted on a bracket member 186 fixed to a fixed plate 188 extending inwardly between rotating plate members 82, 84. The end surface 190 of member 182 is located in a plane closely adjacent to the radially innermost surfaces 106 of pockets 44 so as to be located adjacent and effective relative to the adjacent outer cylindrical surface of the can body members.

LIGHT DETECTOR MEANS

Referring now to FIG. 3, the light detector means 62 comprises a photomultiplier tube subsystem 612, FIG. 15, (discussed in further detail hereinafter) suitably connected to the control circuitry of the testing apparatus for purposes to be hereinafter described.

A tubular support housing 385 is non-rotatably adjustably mounted in a bore 386 in support plate member 378 in coaxial alignment with sealing means 56 by a mounting plate 387 and suitable fastening elements 388. A central bore 389 is adapted to receive and support the photomultiplier tube subsystem 612 therewithin. An access cover 390 is provided at one end of the housing 385 and an annual attachment flange portion 392 is provided at the other end. An annular mounting plate 394, having an annular bearing ring member 396 suitably fixedly attached thereto, is fixedly mounted on flange portion 392 by suitable fastening elements 398. Connecting coaxial bores 400, 402 provide light passages and the interface of members 392, 394 is sealed against passage of light by a sealing ring member 404. The bearing ring member 396 is made of good bearing polymer plastic material and has a side surface 406 adapted to slidably sealably engage the adjacent side surface 364 of member 86 thereby preventing the passage of light into housing 385 except through transparent window plate 353 from chamber 358 in member 86. The support housing 385, mounting plate 394, and bearing ring member 396 are axially resiliently biased toward surface 364 by compression springs 407 mounted on pin members 408 adjustably supported on plate 387 by suitable fastening elements 409.

LIGHT APPLYING MEANS

Referring now to FIGS. 6 and 14, in the presently preferred embodiment, the light applying means 60, located at the test station, comprise seven elongated florescent lamps 412, 413, 414, 415, 416, 417, 418. A first pair of axially extending lamps 412, 413 and associated reflector device 420 are mounted on the cover member 78 approximately 30° on one side of the test station and a second pair of axially extending lamps 414, 415 and associated reflector device 422 are mounted on cover member 78 on the other side of the test station. A single outer center lamp 416 and associated reflector device 424, extending generally tangentially to the path of movement of the transfer wheel means, are mounted on cover member 78 directly above the test station. A pair of inner center lamps 417, 418 and associated reflector device 426, extending generally tangentially to the path of movement of the transfer wheel means, are mounted on a bracket assembly 428 non-rotatably supported on the end portion 429 of bracket 188 directly below the test station. It has been determined that florescent lamps, such as arranged in FIGS. 6 and 14, provide a substantially uniform illumination intensity pattern about the can body at the test station without requiring the use of reflectorized machine surfaces as disclosed in prior art apparatus. In fact, all surrounding metallic machine surfaces are anodized to provide black non-reflecting coloring which provides more uniform test results. As shown in FIG. 6, each of the axially extending reflector devices 420, 422 are arranged to specifically direct a portion of the light from the associated lamps at the radially innermost half area 429 of the can body member.

As shown in FIG. 14, each of the circumferentially tangentially extending reflector devices 424, 426 are arranged to direct a portion of the light from the associated lamps at both the flange end of the can body member in the general annular area 430 and to a lesser extent at the bottom end of the can body member in the area 431, with there being a high concentration of reflected light directed at the specific annular area 432 of engagement of the rim portion 22 with the sealing lip portion 342. Thus, any pinhole or crack type defects in the can body member will transmit light into the inside 18 of the can body member 14 where any such transmitted light will be detected by the photomultiplier tube through chamber 358 and window 353. In addition, any cracks in the flange portion 20 of the can body member will permit transmission of light into chamber 358 and any substantial dents will permit passage of light between the rim portion 22 and the sealing lip portion 342 into the chamber 358 for detection by the photomultiplier tube.

PHOTOMULTIPLIER TUBE ASSEMBLY

As illustrated in the drawings the photomultiplier tube assembly comprises a tube subsystem 612, and an interface electronic subsystem 616, FIG. 15. The tube subsystem 612 comprises a conventional photomultiplier tube (hereinafter PMT) 620 having a dynode chain divider network (not shown) such as, for example, EMI/GENCOM 9856B, and a tube housing assembly of conventional construction including, a preamplifier 626, gating board 628, and necessary cables (not shown) including cables to energize the dynode chain and cables to transmit electronic signals generated by the PMT 620. The tube housing assembly may be of a type which is commercially available and well known in the art such as EMI/GENCOM RFI/B256-F and GB 1001B and VA.015 manufactured by EMI/GENCOM Inc. of Plainview, Long Island, New York 11803. The PMT subsystem 612 is operably mounted on the light-testing apparatus as described in further detail herein.

The PMT gating board 628 is used to turn the PMT 620 on and off to greatly reduce light saturation effects. When the PMT 620 is "off" the first dynode (not shown) in the dynode chain divider network (not shown) is reversed biased with respect to the photocathode causing most generated photoelectrons to return to the photocathode, rather than continuing through the dynode chain and being amplified. Thus when high light levels are incurred, the short duration of on-time with respect to off-time greatly minimizes the saturation signal decay time. Photomultiplier tubes operable in the above described manner are well known in the art and commercially available; one typical example is EMI/GENCOM 9856B.

The signal generated by the PMT 620 is preamplified by the tube preamplifier 626 in the tube housing. A typical amount of pre-amplification is approximately 50 times the original signal strength.

The electronic subsystem 616 is powered by conventional power supply means 601 such as a bipolar power supply providing ±12 volts direct current (VDC) which is conventionally connected to the electronic subsystem. The power supply means may be a conventionally available unit such as Power General 226A. The preamplified PMT signal from preamplifier 626 is transmitted to the electronic subsystem 616 by appropriate cables where it is further amplified by the interface electronics amplifier 642. In one preferred embodiment, the interface electronics amplifier 642 amplifies the signal 8.2 times the original signal strength. Any number of conventional amplifiers such as National Semiconductor Model LM 218N may be used for this purpose. The signal output from amplifier 642 feeds a pulse shaper 644. The pulse shaper is an averaging means which generates an output signal which remains at a single continuous positive value, as long as the input to the pulse shaper 644 is above a predetermined threshold level. The output changes to a single continuous negative value when the pulse shaper 644 input falls below the predetermined threshold level. The pulse shaper 644 may be a conventional circuit element such as a National Semiconductor LM311N, and in one preferred embodiment has a fixed threshold of 0.7 volts direct current (hereinafter VDC), thus so long as the signal strength from the amplifier 642 remains above the threshold level, the pulse shaper 644 outputs a positive voltage over a period of time which generates a pulse having a length proportionate to the period of time that the output signal remains positive. When the input to the pulse shaper 644 drops below the threshold level, the output becomes negative. In one preferred embodiment the positive value of the pulse is 12 volts and the negative value is −12 volts. The nature of the output signal 640 from the PMT 620 is characterized by pulses of varying density and strength, which in turn produce varying time width digital pulses as output from the pulse shaper 644 in response to light emitted through a can flaw. A positive only integrator 646 integrates (sums) the positive time pulses from the pulse shaper 644, which are generated when the input signal is above the threshold level, to yield a signal proportional to the strength of the PMT signal 640. In the case of a PMT signal 640 generated in the between-pockets position, the integrator output signal is proportional to the total noise in the PMT 620. During PMT/pocket alignment, the strength of the output signal from the integrator 646 is proportional to the total noise in the PMT 620 plus the energy generated by light passing through a flaw in a can in the pocket at the time of measurement. The positive only integrator 646 may be a conventional circuit element such as National Semiconductor LM218N or the like. The signals output by the positive integrator 646 are separated for comparison by a timing circuit 650.

The timing circuit 650 will now be described. A time pulse generator 652 provides an electronic clock pulse signal 654 which is used for triggering the interface electronics 616 for noise measurement and light measurement. The clock pulse signal 654 is a square wave signal having a rising edge 656 corresponding to the time of PMT/pocket alignment and having a falling edge 658 corresponding to the PMT 620 being positioned between-pockets alignment. The clock pulse signal 654 may be generated by several methods. One preferred method of generating a clock pulse signal 654 is through the use of a conventional encoder device 600, FIG. 1 which is operably connected and driven by drive shaft means 36. The encoder 600 is synchronized with respect to the pocket and between pocket measurement positions and may be of an absolute type putting out one pulse for each pair of alignment positions or may be a relatively high frequency type with additional conventional circuitry provided by a machine reference position sensing means to provide one pulse per pair of alignments. An encoder such as Baldwin 5V278 Optical Incremental Encoder may be used for this purpose.

The clock pulse signal 654 passes through an optical isolator 660 such as a Hewlett Packard Model 4N46 which provides electrical system isolation to reduce signal noise. The clock pulse signal edge 656 triggers a first one shot 662 which has the property of outputting a fixed time pulse signal when a positive edge is presented at its input. One shot 662 may be constructed from a conventional element such as Signetics Model NE555. The negative edge 658 of the clock pulse signal 654 activates a logic inverter 664 such as provided by a Motorola Model MC 14049 which outputs the logical complement of the input. Thus a positive edge is output by the logic inverter 664 in response to a negative edge input corresponding to a noise measurement alignment. The positive and negative edge functions may of course be reversed by the use of appropriate circuitry and such a change is within the scope of the invention, the function of the rising and falling edges being to distinguish between the pocket alignment and between pocket measuring positions. The between pocket alignment positive edge output by logic inverter 664 activates a second one shot 666 which may be of identical construction to the first one shot 662. The output of the one shot 662 enables a pocket measurement sample hold element 667. The sample hold may be a conventional circuit element such as National Semiconductor model LF398N which acts as a triggered circuit that samples the present value of input received from the positive only integrator 646 and holds its last sample on command. The signal from the second one shot 666 activates a noise measurement sample hold 668 which is of similar or identical construction to the pocket measurement sample hold 667 and which is also connected to the positive only integrator output. Since the time pulse generated by the first one shot takes place during the period of pocket/PMT alignment and the time pulse output by the second one shot 666 takes place during the period when the PMT is between-pockets alignment, the pocket measurement sample hold 667 holds a signal value generated during light test measurement and the noise measurement sample hold 668 holds a signal value generated during noise measurement. A differential amplifier 669 which may be constructed from a National Semiconductor Model LM218N circuit element, outputs a value which is dependent on the difference between the input received from pocket measurement sample hold 667 and noise measurement sample hold 668. Thus the differential amplifier 669 output is dependent on the light sensing portion of a signal. The differential amplifier 669 output is input to a threshold comparator which can be constructed from a National Semiconductor Model LM311N circuit element. The threshold comparator 670 outputs a signal if the input value is above the threshold setting and does not put out a signal if the value is below the threshold setting. In one preferred embodiment the differential amplifier output is equal to 0.83 multiplied by the light test measurement minus the noise measurement with the threshold comparator threshold level at 0.7 VDC. Thus a light test measurement must be greater than 1.2× (noise measurement) +0.7 VDC before a can reject signal is generated. When a reject signal is generated, the reject circuitry is actuated thereby which causes the can body in the associated pocket to be rejected.

The length of the time pulses output by each one shot are of very short duration and in one preferred embodiment are on the order of 825 microseconds for both the noise measurement and for the light test measurement. The PMT 620 is turned on for approximately 1100 microseconds during each measuring period by PMT switching means. Such short interval PMT "on" periods are necessary to prevent the PMT 620 from being saturated with energy during the measurement periods. However, when a can is not present in a pocket which is aligned for measurement with the PMT 620 the amount of light entering the PMT 620 even during the short PMT "on" period could be sufficient to saturate the PMT 620 and prevent proper operation of the system depending on the exterior light level used and the energy storage characteristics of the PMT 620. In order to provide added protection, a can empty pocket detection means 50 described in further detail herein before senses the presence or absence of a can in a pocket 44 prior to measurement and in the case where no can is in the pocket 44, sends a signal which passes through an optical isolator 680 and is thereafter connected to the above described timing circuitry. The signal indicating no can in pocket is characterized by a positive voltage time pulse and is a first input to an AND-gate 682. The one shot 662 signal associated with pocket measurement is the second input to the AND-gate 682. The AND-gate 682 may be a conventional element such as Motorola MCP14081 and has the property of outputting a signal only if two positive value input signals are received simultaneously. The output from the AND-gate 682 is received by one input of a first OR-gate 684. The signal from the noise measurement one shot 666 is received by the other OR-gate 684 input. The OR-gate 684 may be conventional construction such as Motorola MCP Model 14071 and has the property of outputting a signal if receiving a signal from one or both of its two inputs. The output from the OR-gate 684 actuates a third one shot 685 when the OR-gate 684 is actuated by either input. The one shot 685 signal turns the PMT 620 "on" for the duration of the one shot time pulse. As previously mentioned, in one preferred embodiment, the length of that time pulse is 1100 microseconds. Thus, the PMT 620 is provided with a switching means whereby it is turned "on" in response to each between-pocket alignment by actuation through one shot 666. The PMT is also turned "on" by the switching means during a portion of each pocket alignment in response to a pulse signal from one shot 662 but only if a can is present in the pocket. If no can is present in the pocket, the AND-gate 682 will not emit a signal and the PMT 620 will not be switched "on".

In an alternate embodiment illustrated by the circuit fragment of FIG. 17, the no-can-in-pocket signal is eliminated and the output of one shot 662 is connected directly to OR-gate 684, the remainder of the circuit is the same.

As further illustrated by FIG. 15, the positive only integrator 646 is reset after each measurement by timing circuitry connected to the pocket measurement and noise measurement one-shots 662, 666. Outputs from the one shots 662, 666 are connected to a second OR-gate 686 similar in construction to OR-gate 684. The output from OR-gate 686 actuates two one-shots 688, 690 connected in series.

One shot 688 generates a time pulse with a short period, 20 microseconds in the preferred embodiment, which triggers the second one shot 690 at the end of the period. One shot 690 has a relatively larger period time pulse, 900 microseconds in the preferred embodiment. Thus the positive only integrater is actuated for the duration of the one shot 690 time pulse and is reset to zero at the end of the time pulse.

The timing functions of various elements accompanying a noise measurement in the preferred embodiment is illustrated in FIG. 16. Here it may be seen that a noise measurement falling edge from the clock pulse signal 654 occurring at time X triggers one shot 666 which in turn actuates noise measurement sample hold 668 for 825 microseconds. Thus the sample hold 668 is actuated from time X to time X+825 microseconds. The same time pulse from one shot 666 triggers OR-gate 684 at the beginning of the 666 time pulse and OR-gate 684 in turn triggers one shot 685. One shot 685 generates a time pulse having a duration of 1100 microseconds which is used to switch the PMT 620 "on" for the duration thereof. Thus the PMT 620 is switched "on" from time X to time X+1100 microseconds. The time pulse from one shot 666 also triggers OR-gate 686 at the beginning of the 666 time pulse. OR-gate 686 in turn simultaneously triggers one shot 688 which generates a 20 microsecond time pulse. One shot 690 is conventionally connected to one shot 688 in a manner whereby it is triggered at the end of the one shot 688 time pulse. One shot 690, upon being triggered generates a time pulse having a duration of 900 microseconds. Positive only integrator 646 is actuated by the 690 time pulse for the duration thereof. The 688 time pulse, having been generated at time X, lasts until time X+20 microseconds. The 690 time pulse is thus generated and the integrator 646 actuated, at time X+20 microseconds. The 690 pulse lasts until time X+20 microseconds+900 microseconds or X+920 microseconds. Thus as illustrated by FIG. 16, a short delay (20 microseconds) is introduced after the PMT 620 is switched on before the positive only integrator 646 is actuated. The delay is introduced to eliminate the measurement of a short duration noise pulse (less than 20 microseconds) which is introduced when the PMT 620 is initially switched on. It may also be seen that the sample hold 668 actuation period ends prior to the end of the positive only integrator 646 actuation period. This is necessary since the positive only integrator output signal value returns to zero at the end of its actuated period. It will also be seen that the PMT 620 is switched "off" shortly after the measuring functions are completed to prevent unnecessary energy saturation of the PMT 620.

OPERATION

In the presently preferred embodiment of the afore-described apparatus, the infeed chute means 48 is connected to a continuous supply of drawn and ironed aluminum can body members 14 which have a formed flange 20 and which are supposed to have a printed ink label on the exterior peripheral surface of the side wall portion. In normal continuous operation, the solenoid operated pins 176 associated with the infeed chute 48 are withdrawn so that such can body members 14 are stacked in the chute for continuous gravity feed movement therethrough. In the event that it is desired to interrupt the continuous gravity feed of the can body members, the solenoid means 174, 175 may be actuated to extend pins 176 into engagement with the can body member, one pin entering the opening 19 and extending into the interior of an axially aligned can body member in chute passage 130, the pins 176 being located on the chute in a position to be axially aligned with one of the can body members therein.

In continuous operation of the apparatus, the drive shaft means 36 is continuously rotated in the direction of the arrows and causes continuous rotation of the transfer wheel means 42. All loading, testing, and unloading functions are performed during one revolution of the transfer wheel means. The rotational speed of the apparatus is controlled by a conventional speed control unit (not shown) which monitors the number of cans present in associated stacking apparatus (not shown) above the infeed chute 48. The speed control unit varies the rotational speed of the apparatus in a manner to ensure that a sufficient number of cans are available to load each pocket of the apparatus and to increase the speed of operation of the apparatus as more cans become available for loading.

During each revolution, empty pockets 44 are rotated past the infeed means 48 whereat one can body member is gravity loaded into each pair of axially aligned pockets 44 on the transparent plate member 82, 84. As indicated in FIG. 11, the initial loading occurs along radial line 169 at approximately 50° before upper vertical centerline 46. As the can body member is carried further upwardly from the infeed means, the seating means 51 is effective to fully seat and maintain the can body member on arcuate segment surfaces 106 of the pockets. The seating means brushes 200, 201 are initially effective at a first rotational position 502 located at about 45° before upper vertical centerline 46 and substantially fully seat the can body member in the next 5° of generally upward rotation while being continuously effective for about 38° of rotation.

The unprinted can body member detector means 64 is located at a second rotational position 504 at about 30° beyond the first position. The detector means is a self-contained conventional retroreflective photodetector unit having a light source for applying light to the outer peripheral surface of the side wall portion 16 of the can body member and having a light detection means for generating a defective can body member control signal upon reflection of a predetermined level of light from the outer peripheral can body member surface indicative of the absence of a printed ink label thereon. The defective can body member control signal is utilized to subsequently cause discharge of the unprinted can body member into discharge chute means 66 as hereinafter described.

The extendable and retractable means 52, associated with each of the aligned pairs of pockets 44, are initially actuated at a third rotational position 506 about 40° before the upper vertical centerline 46 and are gradually axially, slidably displaced, during approximately the next 40° of generally upward rotation, from the fully retracted position to the fully extended position at about the time of reaching the upper vertical centerline 46. As the means 52 are extended, abutment surface 220 on releasable holding means 54 abuttingly engages the can body member bottom wall portion 17 and axially displaces the can body member relative to the arcuate surface segments 106 of the aligned pockets 44 and relative to the seating means 51 which maintains the can body member on and in slidable engagement with the arcuate segment surfaces 106. The axial movement of the means 52 continues until the flange portion 20 is located in abutting engagement with the flexible sealing lip portion 342 of sealing means 56, as shown in FIG. 9, at approximately the upper vertical centerline rotational portion 508.

When, or preferably slightly before, the can body member has been axially shifted to locate the flange portion 20 in engagement with the flexible sealing lip portion 342, vacuum is applied to the releasable holding means 54 by alignment of the vacuum passage 248 in connecting plate 244 with the arcuate vacuum chamber 250 in manifold member 252. As shown in FIG. 11, the vacuum passage 248 becomes aligned with vacuum chamber 250 at rotational position 510 along radial line 280 about 6° before the vertical centerline 46 so that vacuum holding of the can body member is effected before beginning the generally downward rotation after centerline 46. The vacuum chamber 250 extends circumferentially about 170° and terminates at radial line 282 about 16° before the lower vertical centerline 45 so that the vacuum is continuously applied to the releasable holding means for about 170° of rotation to effect vacuum holding of the can body members on the releasable holding means unless sooner terminated as hereinafter described.

In addition, when, or preferably slightly before, the can body member has been axially shifted to locate flange portion 20 in engagement with the flexible sealing lip portion 342, pressurized air is applied to chamber 358 and the interior of the can body member by alignment of the associated one of the air passages 362, 363 in member 86 with the associated one of the arcuate air chambers 368, 370 in manifold member 366. The accurate air chambers 368, 370 in turn receive air at a predetermined pressure through control valve means 600 in fluid communication with an air pressure source (not shown). As shown in FIG. 11, the associated air passages and air chambers become aligned along radial line 280 about 6° before vertical centerline 46 so that pressurization of the sealing lip portion 342 and the interior of the can body member is initiated before beginning the generally downward rotational movement beyond centerline 46. As shown in FIG. 11, the associated air passages and air chambers remain aligned until reaching radial line 512 after about 50° of rotation beyond centerline 46. By the time the can body member reaches the test position 514 along radial line 383, an internal can pressurization of between 7 to 15 psi has been effected.

Thus, as the pressurized can body member is carried into alignment with the light testing means 62, any light passing from outside the can body member through any pin holes in the wall portions or through cracks in the flange portion 20 or between the sealing lip portion 342 and the rim portion 22 will be sensed by the photomultiplier tube 620 and a defective can body member signal will be generated for purposes to be hereinafter described.

As soon as the test has been completed, the application of pressurized air to chamber 358 is terminated at rotational position 520 along radial line 512, FIG. 11. Then the extendable and retractable means 52 begin axial movement from the extended position to the retracted position and the axial movement is completed during about the next 40° of rotation so as to be located in the fully retracted position by the time the can body member reaches rotational position 522 along horizontal centerline 57. During the axial movement from the extended position to the retracted position, the can body member is held on the releasable holding means 54 by vacuum application through passage 218 and chamber 234 against the can body member bottom wall portion 17. Thus, the tested can body member is carried axially and slidably axially displaced relative to the aligned pockets 44 so as to be located in the retracted position illustrated in FIG. 8. In the retracted position, the flange portion 20 is axially spaced a substantial distance from the sealing means 56 and plate member 86 and the bottom wall portion 17 is located relatively closely axially adjacent the side surface 442 of guide plate 94.

Shortly after the can body member is carried generally downwardly, beyond the horizontal centerline 57, at rotational position 524 along radial line 290 10° below centerline 57, the air passage 286 in member 244 is rotated into alignment with air passage 288 in manifold member 252. The flow of pressurized air in passage 288 is controlled by conventional valve means (not shown) actuatable in response to a defective can body member control signal from the non-printed ink label detector means or from the light tester means 62 to permit flow of pressurized air therethrough. Thus, as air passage 286 begins to become aligned with air passage 288 at rotational position 528 along radial line 529 at about 7° below horizontal centerline 57 and when fully aligned at rotational position 524 about 10° below centerline 57, pressurized air is delivered to passage 218 in the releasable holding means 54 to dissipate the vacuum and blow-off a defective can body member.

When a defective can body member is released from the releasable holding means 54 at about rotational position 530, the inertial force on the can body member being carried by the rotating plate members 82, 84 causes the can body member to be separated from the pockets 44 and removed from the transfer wheel means in a generally vertical downward direction along a path of downward movement generally tangential to the circular path of movement of the pockets as indicated by arrow 532. The side surface 442 of guide plate member 94 is effective to axially confine the downward movement of the defective can body member after release from the releasable holding means. In addition, the side wall 436 of the discharge chute means 66 axially opposite guide plate member 94 extends upwardly and terminates at 443 above the radial line 529, whereat application of pressurized air begins, so as to also axially confine the defective can body member during downward movement in chute passage 440.

If no defective can body member signal has been generated, the vacuum is continuously applied to the releasable holding means 54 until the can body member reaches the unloading chute means 68. As shown in FIG. 12, the upper inlet end of the unloading chute means extends beyond the lower vertical centerline 45 about 16° so as to be substantially coterminous with vacuum chamber 250 along radial line 290. After vacuum passage 248 has been disconnected from vacuum chamber 250, air passage 286 is rotated into alignment with an air passage 534 at rotational position 536 along radial line 538. The passage 534 is continuously connected to a source of pressurized air (not shown) by suitable coupling and conduit means (not shown) similar to the means 292, 294, 296 of FIG. 5. As shown in FIG. 12, air passage 534 is located about 10° before lower vertical centerline 45. The upper surfaces 540 of the unloading chute rail member 470 extend generally tangentially relative to the circular path of movement of the pockets 44 at the radial line 538 so that as the can body members are released from the releasable holding means 54, the inertial force of the can body members is directed substantially parallel to the upper surfaces of the unloading chute means 68, as indicated by arrow 542, to enable removal of the can body members from the pockets of the transfer wheel means by inertial force and the effect of gravity. As the released can body member is moved further toward the vertical centerline 45, the upper guide plate 486 is effective to disassociate the can body member from the pockets 44 by relative movement between the can body member and surfaces 108, 114 of the plate members 82, 84. The can body members are rapidly discharged into chute passage 454 and rapidly move through the chute passage to outlet opening 456 which may be connected to a gravity type chute conveyor system (not shown). If a malfunction, such as jamming of can body members, occurs in the unloading operation, creating a high force condition, the rail members 470 will be downwardly pivoted against the bias of spring 478 to enable removal and discharge of can body members toward the discharge passage 440 and actuate a limit switch (not shown) to terminate operation of the apparatus.

It is contemplated that the invention concepts herein described may be variously otherwise embodied and it is intended that the appended claims be construed to include alternative embodiments of the invention except insofar as limited by the prior art.

What is claimed is:

1. A photomultiplier tube assembly for use in high speed light testing apparatus for making a series of light measurements in rapid succession during light-test periods wherein each light-test period is followed by a noise-test period, said light-test periods and noise test periods being spaced apart in time by interval periods, the beginning of said light-test periods and said noise-test periods being determined by the physical orientation of certain moving parts of said high speed light testing apparatus with respect to certain fixed parts of said apparatus, said photomultiplier tube assembly comprising:

(a) photomultiplier tube means operably mounted to receive light during light-test periods and to be shielded from light during noise-test periods for generating a photomultiplier tube electrical signal having a value proportionate to the light received by the said photomultiplier tube means;

(b) photomultiplier tube switching means for switching said photomultiplier tube means on and off operably synchronized with said testing apparatus whereby said photomultiplier tube means is switched on during said light-test periods and said noise-test periods and switched off during said interval periods;

(c) measuring circuit means for measuring said photomultiplier tube signal and generating a measuring signal responsive thereto;

(d) timing means for dividing said measuring signal into a light-test measurement signal and a noise-test measurement signal, said light-test measurement signal corresponding to the portion of said measuring signal associated with said light-test period and said noise-test measurement signal corresponding to the portion of said measuring signal associated with said noise-test period; and (e) comparator circuit means for comparing said light-test measurement signal with said noise-test measurement signal and generating a control signal in response to said comparison;

said timing means comprising monitor means for sensing the occurrence of said light test periods and said noise-test periods as a function of the alignment of predetermined physical parts of said high speed testing apparatus with said photomultiplier tube means and generating a monitoring signal in response to said machine light-test alignment position and said machine noise-test alignment position;

said monitor means comprising encoder means operably mounted on said high speed light testing apparatus for generating an encoder signal; and clock signal generating means for receiving said encoder signal and generating a square wave clock signal in response thereto said clock signal having a light-test portion associated with the machine light-test alignment position and a noise-test portion associated with the machine noise-test alignment position; said light-test portion and said noise-test portion of said clock signal being of opposite polarity;

said timing means comprising:

first time pulse generating means for generating a first time pulse signal of predetermined duration in response to said light test portion of said clock signal;

second time pulse generating means for generating a second time pulse signal of predetermined duration in response to said noise test portion of said clock signal;

the length of said first and second time pulse signals defining the length of said light-test period and said noise-test period, respectively;

first measuring signal sample and hold means for sampling said measuring signal during a period of enablement and holding said measured sample and generating a first sample signal proportionate thereto until the next period of enablement, wherein said first measuring signal sample and hold means is enabled by said first time pulse signal for the duration of said first time pulse signal; and second measuring signal sample and hold means for sampling said measuring signal during a period of enablement and holding said measured sample and generating a second sample signal proportionate thereto until the next period of enablement, wherein said second measuring signal sample and hold means is enabled by said second time pulse signal for the duration of said second time pulse signal.

2. The invention of claim 1 wherein said predetermined duration of said first time pulse signal is equal in length of time to said predetermined duration of said second time pulse signal.

3. The invention of claim 2 wherein one of said time pulse generating means comprises:

a first one shot circuit element; and wherein said other time pulse generating means comprises:

a logic inverter circuit element and a second one shot circuit element.

4. The invention of claim 3 wherein said measuring circuit means for measuring said photomultiplier tube signal and generating a measuring signal in response thereto comprises:

amplifier means for amplifying said photomultiplier tube electrical signal whereby an amplified photomultiplier tube signal is generated;

averaging signal generating means for generating a series of averaging pulses responsive to said amplified photomultiplier tube signal;

integrator means for integrating said averaging pulses during predetermined actuation periods and generating said measuring signal in response to the value of said integration;

said integrator means being actuated and deactuated by said timing means wherein said actuation periods correspond in time to said light-test periods and said noise-test periods.

5. The invention of claim 4 wherein said comparator circuit means comprises differential amplifier means for receiving said first sample signal and said second sample signal and generating a differential amplifier signal dependent on the difference between said sample signals.

6. The invention of claim 5 wherein said comparator circuit means further comprises:

threshold comparator means for receiving said differential amplifier signal and generating a threshold comparator signal only when said differential amplifier signal exceeds a predetermined value.

7. The invention of claim 1, wherein said photomultiplier tube switching means for switching said tube on during said light test periods and said noise-test periods and for switching said tube off during said interval periods comprises:
a first OR-gate for generating an output signal in response to a first input signal or a second input signal wherein said first input signal comprises said first time pulse signal and wherein said second input signal comprises said second time pulse signal; and
third time pulse generating means operably connected for receiving said first OR-gate output signal for generating a third time pulse signal of predetermined duration in response thereto; and
gate means for switching said photomultiplier tube on in response to said third time pulse signal for the duration thereof.

8. The invention of claim 1 wherein said high speed testing apparatus comprises:
a series of spaced apart pockets for carrying articles to be tested and wherein said testing apparatus comprises:
an empty pocket sensing means for sensing the absence of a test article from a pocket prior to light testing, wherein said empty pocket sensing means generates an empty pocket signal in response to said empty pocket immediately prior to and during period of pocket alignment with said photomultiplier tube means wherein said photomultiplier tube switching means comprises:
a first AND-gate for generating an output signal only in response to simultaneously receiving a first AND-gate input signal and a second AND-gate input signal wherein said first time pulse generating means and said empty pocket sensing means are operably connected to said first AND-gate for inputting signals thereto, and
first OR-gate for generating an output signal in response to a first input signal or a second input signal wherein said first OR-gate input signal comprise:
said AND-gate output signal and wherein said second OR-gate input signal comprises said second time pulse signal and wherein said first OR-gate output signal is operably connected to a third time pulse generating means for generating a third time pulse signal of predetermined duration in response to said OR-gate output signal; and
gate means for switching said photomultiplier tube on in response to said third time pulse signal for the duration thereof.

9. A photomultiplier tube assembly for use in high speed light testing apparatus for making a series of light measurements in rapid succession during light-test periods wherein each light-test period is followed by a noise-test period, said light-test periods and noise test periods being spaced apart in time by interval periods, the beginning of said light-test periods and said noise-test periods being determined by the physical orientation of certain moving parts of said high speed light testing apparatus with respect to certain fixed parts of said apparatus, said photomultiplier tube assembly comprising:
(a) photomultiplier tube means operably mounted to receive light during light-test periods and to be shielded from light during noise-test periods for generating a photomultiplier tube electrical signal having a value proportionate to the light received by the said photomultiplier tube means;
(b) photomultiplier tube switching means for switching said photomultiplier tube means on and off operably synchronized with said testing apparatus whereby said photomultiplier tube means is switched on during said light-test periods and said noise-test periods and switched off during said interval periods;
(c) measuring circuit means for measuring said photomultiplier tube signal and generating a measuring signal responsive thereto;
(d) timing means for dividing said measuring signal into a light-test measurement signal and a noise-test measurement signal, said light-test measurement signal corresponding to the portion of said measuring signal associated with said light-test period and said noise-test measurement signal corresponding to the portion of said measuring signal associated with said noise-test period; and
(e) comparator circuit means for comparing said light-test measurement signal with said noise-test measurement signal and generating a control signal in response to said comparison;
said measuring circuit means for measuring said photomultiplier tube signal and generating a measuring signal in response thereto comprising:
amplifier means for amplifying said photomultiplier tube electrical signal whereby an amplified photomultiplier tube signal is generated;
averaging signal generating means for generating a series of averaging pulses responsive to said amplified photomultiplier tube signal;
integrator means for integrating said averaging pulses during predetermined actuation periods and generating said measuring signal in response to the value of said integration;
said integrator means being actuated and deactuated by said timing means wherein said actuation periods are coincidental with and at least as long as said light-test periods and said noise-test periods.

10. A high speed light testing apparatus for continuous testing of one piece can body members having a sidewall portion, and a bottom wall portion at one end defining a container cavity, and an opening at the other end, and a formed flange portion at the other end surrounding the opening for subsequent association with a can closure member; the machine being adapted for testing the can body member for defects including pin holes in the sidewall portion and the bottom wall portion, and unwanted deformation and cracks in the flange portion, the apparatus comprising:
frame and housing means for supporting and housing the machine components;
horizontally extending rotatable shaft means rotatably supported by said frame and housing means and providing a central axis of rotation;
motor means for causing continuous rotation of said rotatable shaft means;
can body member transfer wheel means mounted on said shaft means for rotation therewith and for carrying can body members in a circular path thereabout;
a plurality of pocket means circumferentially spaced about the outer periphery of said transfer wheel means for receiving a can body member in each pocket means and for transferring each can body member along said circular path during a portion of each revolution of said transfer wheel means;

in-feed means mounted on said frame and housing means for loading one can body member in each of said pocket means during each revolution of said transfer wheel means;

light applying means for applying light to the exterior surfaces of each can body member in each of said pocket means, the light applying means being non-rotatably mounted relative to said transfer wheel means and located to provide a continuous light zone during each revolution of said transfer wheel means;

discharge chute means for receiving defective can body members from said transfer wheel means during each revolution of said transfer wheel means;

unloading chute means for receiving non-defective can body members from said transfer wheel means during each revolution of said transfer wheel means;

extendable and retractable means mounted on said shaft means for rotation therewith and being associated with each of said pocket means for axially moving a can body member in each of said pocket means between a first retracted position and a second extended position during a portion of each revolution of said transfer wheel means;

releasable holding means associated with each of said extendable and retractable means for abutting and releasable holding engagement with the bottom wall portion of a can body member in each of said pocket means during a portion of each revolution of said transfer wheel means;

sealing means mounted on said shaft means for rotation therewith and being associated with each of said pocket means and each of said extendable and retractable means for engagement with the flange portion of non-defective can body members carried in each of said pocket means and releasably held by said holding means, the holding means, being operative to effect holding engagement with the bottom wall of said can body member and the extendable and retractable means being operative from the first retracted position to the second extended position to effect sealable engagement of the flange portion of each can body member with the associated sealing means prior to movement of each can body member to said light zone;

light detection means non-rotatably mounted relative to said transfer wheel means and being located for successive axial alignment with each of said pocket means and the opening in the can body member carried thereby opposite said sealing means in the light zone for receiving light only from said light applying means through the can body member and between the flange portion and the sealing means and for generating a control signal upon receipt of light therefrom;

said extendable and retractable means being operative from the second extended position to the first retracted position to retract each can body member from sealable association with said sealing means after movement beyond said light detection means prior to reaching said discharge chute means during each revolution of said transfer wheel means;

defective can body member release control means effective in response to said control signal from said light detection means for releasing each defective can body member before reaching said discharge chute means during each revolution of said transfer wheel means;

non-defective can member release control means effective as each non-defective can body member approaches said unloading chute means for releasing each non-defective can body member and for enabling discharge of non-defective can body members into said unloading chute means during each revolution of said transfer wheel means;

pressurization means associated with each of said sealing means for applying pressurized air to said sealing means for obtaining minimal sealing area engagement between said sealing means and the flange portion of said can body members and for applying pressurized air through the opening to the interior of said can body member to outwardly flex the side wall portion and the bottom wall portion to enhance the passage of light through openings therein;

rotational speed monitoring means for monitoring the speed of said rotatable shaft means and providing a speed monitor signal; and wherein said light detection means comprises:

a photomultiplier tube assembly for use in high speed light testing apparatus for making a series of light measurements in rapid succession during light-test periods wherein each light-test period is followed by a noise-test period, said light-test periods and noise-test periods being spaced apart in time by interval periods, the beginning of said light-test periods and said noise-test periods being determined by the physical orientation of certain moving parts of said high speed light testing apparatus with respect to certain fixed parts of said apparatus, said photomultiplier tube assembly comprising:

(a) photomultiplier tube means operably mounted to receive light during light-test periods and to be shielded from light during noise-test periods for generating a photomultiplier tube electrical signal having a value proportionate to the light received by the said photomultiplier tube means;

(b) photomultiplier tube switching means for switching said photomultiplier tube means on and off operably synchronized with said testing apparatus whereby said photomultiplier tube means is switched on during said light-test periods and said noise-test periods and switched off during said interval periods;

(c) measuring circuit means for measuring said photomultiplier tube signal and generating a measuring signal responsive thereto;

(d) timing means for dividing said measuring signal into a light-test measurement signal and a noise-test measurement signal, said light-test measurement signal corresponding to the portion of said measuring signal associated with said light-test period and said noise-test measurement signal corresponding to the portion of said measuring signal associated with said noise-test period; and (e) comparator circuit means for comparing said light-test measurement signal with said noise-test measurement signal and generating a control signal in response to said comparison;

said timing means comprising:
monitor means for sensing the occurrence of said light test periods and said noise-test periods as a function of the alignment of predetermined physical parts of said high speed testing apparatus with said photomultiplier tube means and generating a monitoring signal in response to said machine light-test alignment position and said machine noise-test alignment position;

said monitor means comprises:
encoder means operably mounted on said high speed light testing apparatus for generating an encoder signal;
clock signal generating means for receiving said encoder signal and generating a square wave clock signal in response thereto; said clock signal having a light-test portion associated with the machine light-test alignment position and a noise-test portion associated with the machine noise-test alignment position; said light-test portion and said noise-test portion of said clock signal being of opposite polarity;

said timing means further comprising:
first time pulse generating means for generating a first time pulse signal of predetermined duration in response to said light test portion of said clock signal;
second time pulse generating means for generating a second time pulse signal of predetermined duration in response to said noise test portion of said clock signal;
the length of said first and second time pulse signals defining the length of said light-test period and said noise-test period, respectively;
first measuring signal sample and hold means for sampling said measuring signal during a period of enablement and holding said measured sample and generating a first sample signal proportionate thereto until the next period of enablement, wherein said first measuring signal sample and hold means is enabled by said first time pulse signal for the duration of said first time pulse signal; and
second measuring signal sample and hold means for sampling said measuring signal during a period of enablement and holding said measured sample and generating a second sample signal proportionate thereto until the next period of enablement, wherein said second measuring signal sample and hold means is enabled by said second time pulse signal for the duration of said second time pulse signal.

11. The invention of claim 10 wherein said predetermined duration of said first time pulse signal is equal in length of time to said predetermined duration of said second time pulse signal;
wherein one of said time pulse generating means comprises:
a first one shot circuit element; and wherein said other time pulse generating means comprises:
a logic inverter circuit element and a second one shot circuit element.

12. The invention of claim 10 wherein said measuring circuit means for measuring said photomultiplier tube signal and generating a measuring signal in response thereto comprises:

amplifier means for amplifying said photomultiplier tube electrical signal whereby an amplified photomultiplier tube signal is generated;
averaging signal generating means for generating a series of averaging pulses responsive to said amplified photomultiplier tube signal;
integrator means for integrating said averaging pulses during predetermined actuation periods and generating said measuring signal in response to the value of said integration;
said integrator means being actuated and deactuated by said timing means wherein said actuation periods correspond in time to said light-test periods and said noise-test periods.

13. The invention of claim 12 wherein said comparator circuit means comprises differential amplifier means for receiving said first sample signal and said second sample signal and generating a differential amplifier signal dependent on the difference between said sample signals.

14. The invention of claim 13 wherein said comparator circuit means further comprises:
threshold comparator means for receiving said differential amplifier signal and generating a threshold comparator signal only when said differential amplifier signal exceeds a predetermined value.

15. A high speed light testing apparatus for continuous testing of one piece can body members having a sidewall portion, and a bottom wall portion at one end defining a container cavity, and an opening at the other end, and a formed flange portion at the other end surrounding the opening for subsequent association with a can closure member; the machine being adapted for testing the can body member for defects including pin holes in the sidewall portion and the bottom wall portion, and unwanted deformation and cracks in the flange portion, the apparatus comprising:
frame and housing means for supporting and housing the machine components;
horizontally extending rotatable shaft means rotatably supported by said frame and housing means and providing a central axis of rotation;
motor means for causing continuous rotation of said rotatable shaft means;
can body member transfer wheel means mounted on said shaft means for rotation therewith and for carrying can body members in a circular path thereabout;
a plurality of pocket means circumferentially spaced about the outer periphery of said transfer wheel means for receiving a can body member in each pocket means and for transferring each can body member along said circular path during a portion of each revolution of said transfer wheel means;
in-feed means mounted on said frame and housing means for loading one can body member in each of said pocket means during each revolution of said transfer wheel means;
light applying means for applying light to the exterior surfaces of each can body member in each of said pocket means, the light applying means being non-rotatably mounted relative to said transfer wheel means and located to provide a continuous light zone during each revolution of said transfer wheel means;
discharge chute means for receiving defective can body members from said transfer wheel means during each revolution of said transfer wheel means;

unloading chute means for receiving non-defective can body members from said transfer wheel means during each revolution of said transfer wheel means;

extendable and retractable means mounted on said shaft means for rotation therewith and being associated with each of said pocket means for axially moving a can body member in each of said pocket means between a first retracted position and a second extended position during a portion of each revolution of said transfer wheel means;

releasable holding means associated with each of said extendable and retractable means for abutting and releasable holding engagement with the bottom wall portion of a can body member in each of said pocket means during a portion of each revolution of said transfer wheel means;

sealing means mounted on said shaft means for rotation therewith and being associated with each of said pocket means and each of said extendable and retractable means for sealable engagement with the flange portion of non-defective can body members carried in each of said pocket means and releasably held by said holding means, the holding means, being operative to effect holding engagement with the bottom wall of said can body member and the extendable and retractable means being operative from the first retracted position to the second extended position to effect sealable engagement of the flange portion of each can body member with the associated sealing means prior to movement of each can body member to said light zone;

light detection means non-rotatably mounted relative to said transfer wheel means and being located for successive axial alignment with each of said pocket means and the opening in the can body member carried thereby opposite said sealing means in the light zone for receiving light only from said light applying means through the can body member and between the flange portion and the sealing means and for generating a control signal upon receipt of light therefrom;

said extendable and retractable means being operative from the second extended position to the first retracted position to retract each can body member from sealable association with said sealing means after movement beyond said light detection means prior to reaching said discharge chute means during each revolution of said transfer wheel means;

defective can body member release control means effective in response to said control signal from said light detection means for releasing each defective can body member before reaching said discharge chute means during each revolution of said transfer wheel means;

non-defective can member release control means effective as each non-defective can body member approaches said unloading chute means for releasing each non-defective can body member and for enabling discharge of non-defective can body members into said unloading chute means during each revolution of said transfer wheel means;

pressurization means associated with each of said sealing means for applying pressurized air to said sealing means for obtaining minimal sealing area engagement between said sealing means and the flange portion of said can body members and for applying pressurized air through the opening to the interior of said can body member to outwardly flex the side wall portion and the bottom wall portion to enhance the passage of light through openings therein;

rotational speed monitoring means for monitoring the speed of said rotatable shaft means and providing a speed monitor signal; and wherein said light detection means comprises:
  a photomultiplier tube assembly for use in high speed light testing apparatus for making a series of light measurements in rapid succession during light-test periods wherein each light-test period is followed by a noise-test period, said light-test periods and noise-test periods being spaced apart in time by interval periods, the beginning of said light-test periods and said noise-test periods being determined by the physical orientation of certain moving parts of said high speed light testing apparatus with respect to certain fixed parts of said apparatus, said photomultiplier tube assembly comprising:
    (a) photomultiplier tube means operably mounted to receive light during light-test periods and to be shielded from light during noise-test periods for generating a photomultiplier tube electrical signal having a value proportionate to the light received by the said photomultiplier tube means;
    (b) photomultiplier tube switching means for switching said photomultiplier tube means on and off operably synchronized with said testing apparatus whereby said photomultiplier tube means is switched on during said light-test periods and said noise-test periods and switched off during said interval periods;
    (c) measuring circuit means for measuring said photomultiplier tube signal and generating a measuring signal responsive thereto;
    (d) timing means for dividing said measuring signal into a light-test measurement signal and a noise-test measurement signal, said light-test measurement signal corresponding to the portion of said measuring signal associated with said light-test period and said noise-test measurement signal corresponding to the portion of said measuring signal associated with said noise-test period; and
    (e) comparator circuit means for comparing said light-test measurement signal with said noise-test measurement signal and generating a control signal in response to said comparison;

said timing means comprising:
  monitor means for sensing the occurrence of said light test periods and said noise-test periods as a function of the alignment of predetermined physical parts of said high speed testing apparatus with said photomultiplier tube means and generating a monitoring signal in response to said machine light-test alignment position and said machine noise-test alignment position;

said monitor means comprising:
  encoder means operably mounted on said high speed light testing apparatus for generating an encoder signal;
  clock signal generating means for receiving said encoder signal and generating a square wave clock signal in response thereto said clock signal having a light-test portion associated with the machine light-test alignment position and a noise-test portion associated with the machine noise-test alignment position; said light-test portion and said noise-test portion of said clock signal being of opposite polarity;

wherein said measuring circuit means for measuring said photomultiplier tube signal and generating a measuring signal in response thereto comprises:

amplifier means for amplifying said photomultiplier tube electrical signal whereby an amplified photomultiplier tube signal is generated;

averaging signal generating means for generating a series of averaging pulses responsive to said amplified photomultiplier tube signal;

integrator means for integrating said averaging pulses during predetermined actuation periods and generating said measuring signal in response to the value of said integration;

said integrator means being actuated and deactuated by said timing means wherein said actuation periods are coincidental with and at least as long as said light-test periods and said noise-test periods.

16. A light detection assembly for use in high speed light testing apparatus for making a series of light measurements in rapid succession during light-test periods wherein each light-test period is followed by a noise-test period, said light-test periods and noise-test periods being spaced apart in time by interval periods, the beginning of said light-test periods and said noise-test periods being determined by the physical orientation of certain moving parts of said high speed light testing apparatus with respect to certain fixed parts of said apparatus, said light detection assembly comprising:

(a) light detecting means operably mounted to receive light during light-test periods and to be shielded from light during noise-test periods for generating a light detecting means electrical signal having a value proportionate to the light received by the said light detecting means;

(b) measuring circuit means for measuring said light detecting means signal and generating a measuring signal responsive thereto;

(c) timing means for dividing said measuring signal into a light-test measurement signal and a noise-test measurement signal, said light-test measurement signal corresponding to the portion of said measuring signal associated with said light-test period and said noise-test measurement signal corresponding to the portion of said measuring signal associated with said noise-test period; and (d) comparator circuit means for comparing said light-test measurement signal with said noise-test measurement signal and generating a control signal in response to said comparison;

said measuring circuit means for measuring said light detecting means signal and generating a measuring signal in response thereto comprising:

amplifier means for amplifying said light detecting means electrical signal whereby an amplified light detecting means signal is generated;

averaging signal generating means for generating a series of averaging pulses responsive to said amplified light detecting means signal;

integrator means for integrating said averaging pulses during predetermined actuation periods and generating said measuring signal in response to the value of said integration;

said integrator means being actuated and deactuated by said timing means wherein said actuation periods are coincidental with and at least as long as said light-test periods and said noise-test periods.

* * * * *